(12) United States Patent
Jolly

(10) Patent No.: US 11,667,552 B2
(45) Date of Patent: Jun. 6, 2023

(54) SILVER ION BIOCIDE DELIVERY SYSTEM

(71) Applicant: Clifford D. Jolly, Parker, CO (US)

(72) Inventor: Clifford D. Jolly, Parker, CO (US)

( * ) Notice: Subject to any disclaimer, the term of this patent is extended or adjusted under 35 U.S.C. 154(b) by 217 days.

(21) Appl. No.: 17/080,393

(22) Filed: Oct. 26, 2020

(65) Prior Publication Data

US 2021/0039971 A1 Feb. 11, 2021

Related U.S. Application Data

(63) Continuation of application No. 16/056,355, filed on Aug. 6, 2018, now Pat. No. 10,815,137.

(51) Int. Cl.
*C02F 1/50* (2023.01)
*C02F 1/00* (2023.01)
*C02F 1/467* (2023.01)
*C02F 1/68* (2023.01)
*C02F 1/46* (2023.01)

(52) U.S. Cl.
CPC ............. *C02F 1/505* (2013.01); *C02F 1/008* (2013.01); *C02F 1/4672* (2013.01); *C02F 1/687* (2013.01); *C02F 1/4606* (2013.01); *C02F 1/688* (2013.01); *C02F 2201/4612* (2013.01); *C02F 2209/001* (2013.01); *C02F 2209/003* (2013.01); *C02F 2209/006* (2013.01); *C02F 2209/02* (2013.01); *C02F 2209/06* (2013.01); *C02F 2209/36* (2013.01); *C02F 2209/40* (2013.01); *C02F 2301/043* (2013.01); *C02F 2303/04* (2013.01)

(58) Field of Classification Search
None
See application file for complete search history.

(56) References Cited

U.S. PATENT DOCUMENTS

| | | | |
|---|---|---|---|
| 2,692,855 | A | 10/1954 | Juda |
| 3,999,048 | A | 12/1976 | Parthemore |
| 4,198,296 | A | 4/1980 | Doumas et al. |
| 5,464,559 | A | 11/1995 | Marchin et al. |
| 6,017,461 | A | 1/2000 | Garvey et al. |
| 6,524,540 | B1 | 2/2003 | Heinig, Jr. |

(Continued)

OTHER PUBLICATIONS

Eisner et al., The anodic stripping voltammetry of trace silver solutions employing graphite electrodes . . . 24(2-3) J. Electroanal. Chem. (1970), pp. 345-355 [From Parent U.S. Appl. No. 16/056,355, filed Aug. 6, 2018].

(Continued)

*Primary Examiner* — Richard C Gurtowski
(74) *Attorney, Agent, or Firm* — Hunton Andrews Kurth LLP

(57) ABSTRACT

A system and method for delivering silver ion biocide is described herein. The systems described relate to passing water from a water system through a silver ion release module and optional high-concentration silver ion release module. The system includes an analyzer, detector, and/or controller for monitoring the concentration of silver ion and adjusting the flow path, flow rate, temperature and/or pH of the water in order to obtain the desired concentration of silver ion. The system optionally includes other metal ions released into a water system, the concentration of which may be used to automatically calibrate the described system and/or cause the system to take actions based on the measured concentration of silver ion or of the second metal ion.

15 Claims, 11 Drawing Sheets

(56) References Cited

U.S. PATENT DOCUMENTS

| | | |
|---|---|---|
| 10,815,137 B2 * | 10/2020 | Jolly ................... C02F 1/4672 |
| 2003/0164308 A1 | 9/2003 | Schlager et al. |
| 2004/0112838 A1 | 6/2004 | Martin |
| 2004/0223944 A1 | 11/2004 | Capelli |
| 2006/0186222 A1 | 8/2006 | Ikemizu et al. |
| 2010/0230365 A1 | 9/2010 | Hill et al. |
| 2011/0274768 A1 | 11/2011 | Nakamura |
| 2014/0124426 A1 | 5/2014 | King et al. |
| 2014/0202943 A1 | 7/2014 | Pradeep et al. |

OTHER PUBLICATIONS

Int'l Search Report & Written Opinion (PCT/US2018/045442), dated Oct. 23, 2018 [From Parent U.S. Appl. No. 16/056,355, filed Aug. 6, 2018].

* cited by examiner

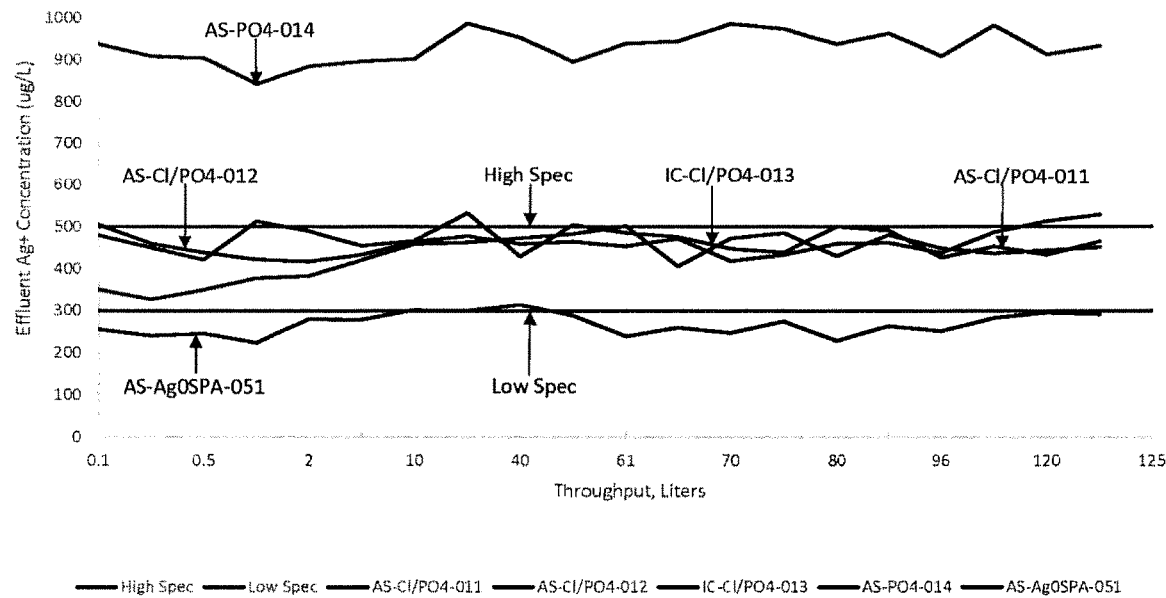
Figure 1. Effluent Ag* Data from Ag$_3$PO$_4$, AgCl-SPA, and Ag$^0$-SPA Pellets
Effects of Varying Influent TOC, k & pH on Effluent Ag$^+$ Concentration
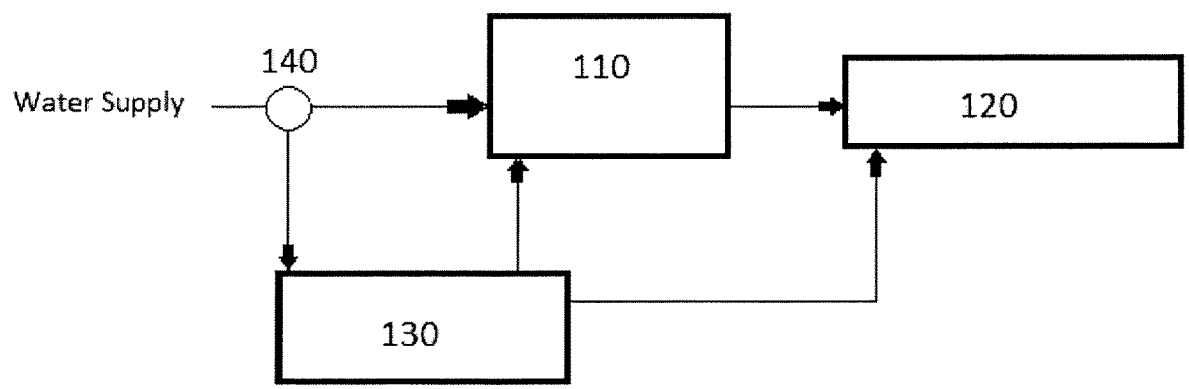
Figure 2

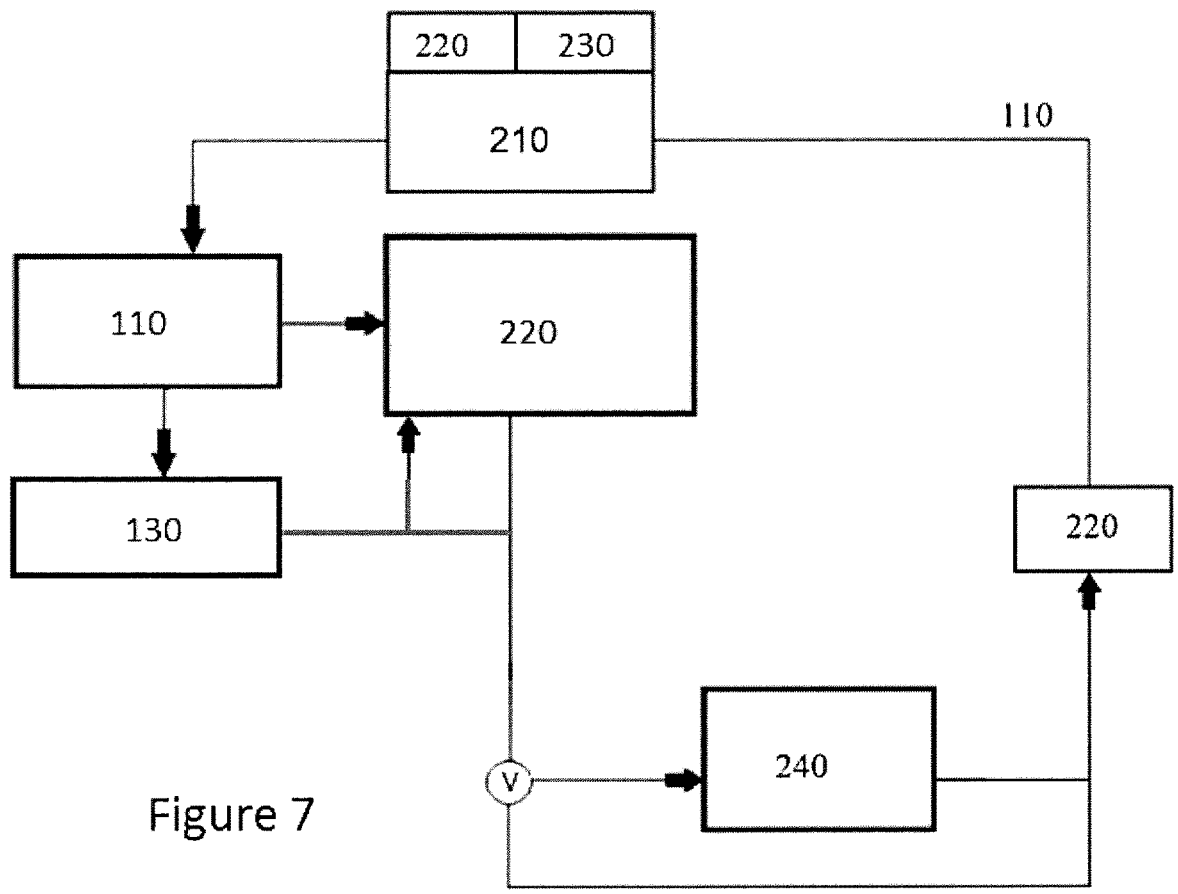
Figure 7
Figure 8
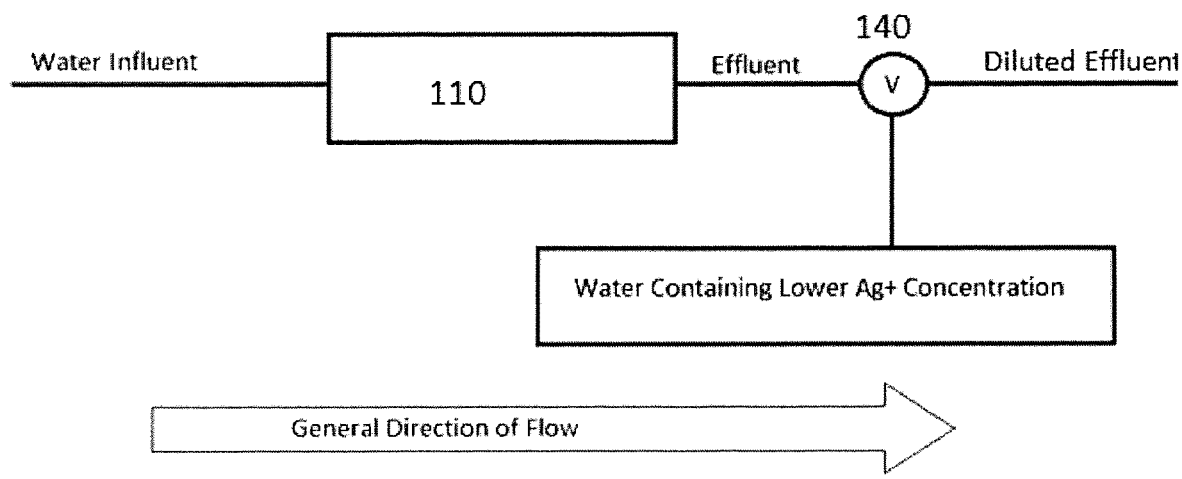

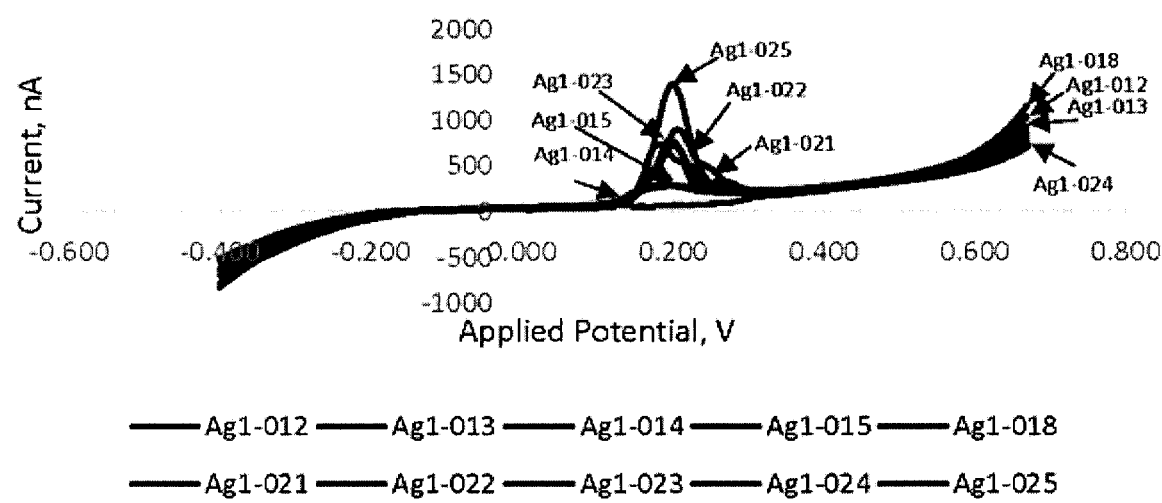
Figure 13 - SEMS Detection Limit Test Scan Scan Ag$^+$ Blank to 100 ug/liter

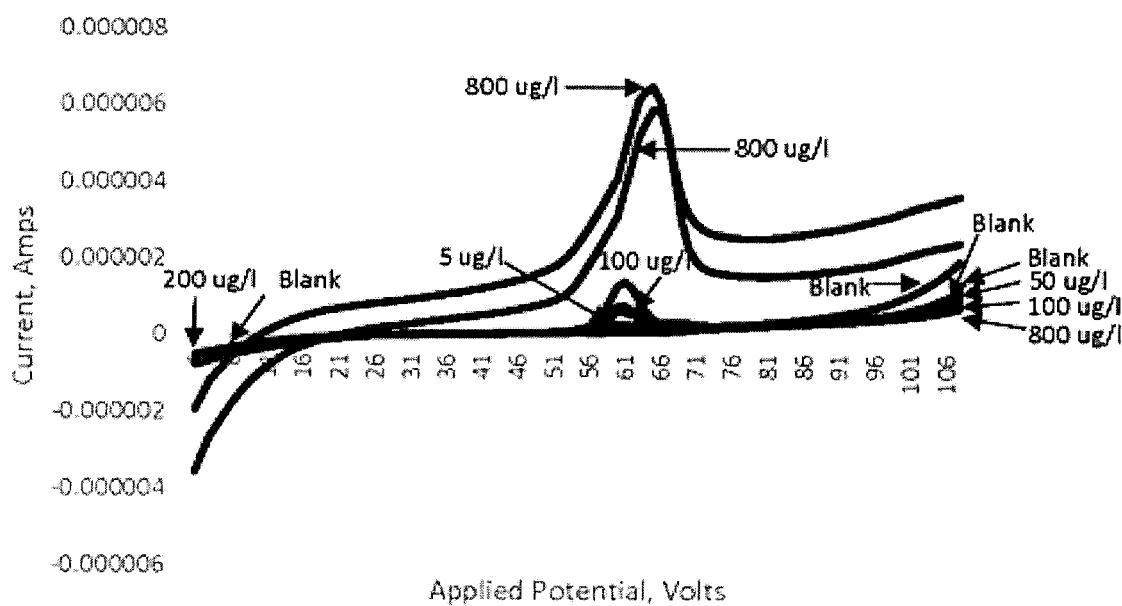

SILVER ION BIOCIDE DELIVERY SYSTEM

CROSS REFERENCE TO RELATED APPLICATIONS

This application is a continuation of currently allowed U.S. application Ser. No. 16/056,355 filed Aug. 6, 2018 (issuing Oct. 27, 2020 as U.S. Pat. No. 10,815,137) which claims the benefit of U.S. Provisional Application Ser. No. 62/622,561 filed Jan. 26, 2018, and U.S. Provisional Application Ser. No. 62/629,507 filed Feb. 12, 2018 and U.S. Provisional Patent Application Ser. No. 62/568,582, filed Oct. 5, 2017. Applicant incorporates by reference herein Application Ser. No. 62/622,561 in its entirety, Application Ser. No. 62/629,507 in its entirety, and Application Ser. No. 62/568,582 in its entirety.

These inventions were made at least partially with Government support. The Government may have certain rights in these inventions.

FIELD OF INVENTION

The present inventions are related to Silver Ion Biocide Delivery and Control Devices which incorporate the generation and/or release of metal ions into a water supply. More specifically, the present inventions relate to release and control of silver ion biocide in industrial process water and potable water. Embodiments may be used to generate, release, analyze and/or control the concentration of silver ion and other metal ions in water recovery and supply systems.

BACKGROUND AND SUMMARY

Silver is of interest as a biocide for water treatment because it does not need to be entirely removed from the water. Microbial contamination in water can be controlled by adding silver ions at biologically active concentrations. Silver ions may be generated by electrochemically oxidizing silver electrodes into a water supply. Microbial control of finished waters can be maintained by maintaining a consistent concentration of about 10 μg/l to 1,000 μg/l of silver ion. Additionally, a water system may be periodically exposed to significantly higher concentrations of silver ion as it is deemed necessary in order to prevent or reverse biofilm growth, and for general system maintenance. In these instances, silver ion concentration may be about 1,000 μg/liter, or one to several orders of magnitude greater.

Water may also be purified by releasing silver ions contained in a soluble or semi-soluble medium by adding $Ag^+$ via liquid solution injection, or by controlled release or controlled solubility using a number of solid-phase reagent approaches. The controlled solubility medium could be a form of silver attached to ion exchange resin, and/or a metal oxide, metal halide, or metal salt containing silver, and/or metallic silver, or a combination, mixture or alloy of metals containing silver. In some embodiments, the silver containing material or silver ion source may include silver bromide, silver chloride, silver iodide, silver fluoride, and/or silver phosphate. Characteristics of the water supply to be treated and the device used to impart $Ag^+$ ion impact the concentration of silver ion in the water supply. The temperature, pH, flow rate, flow path, and total volume, among other characteristics, of the water supply may each be calibrated or adjusted in order to achieve the desired concentration of silver ion.

BRIEF DESCRIPTION OF THE DRAWINGS

FIG. 1 shows data relating to the concentration of silver ion in effluent.

FIG. 2 shows a schematic of water flow for utilizing silver ion release unit and high concentration module.

FIG. 7 shows a schematic of a potential water system utilizing an analyzer, controller and multiple detectors.

FIG. 8 shows a schematic of a water system utilizing dilution to adjust the concentration of silver ion.

FIG. 13 shows detection limit testing data of multiple silver samples.

FIG. 14 shows range testing data.

DETAILED DESCRIPTION

Figure 3:
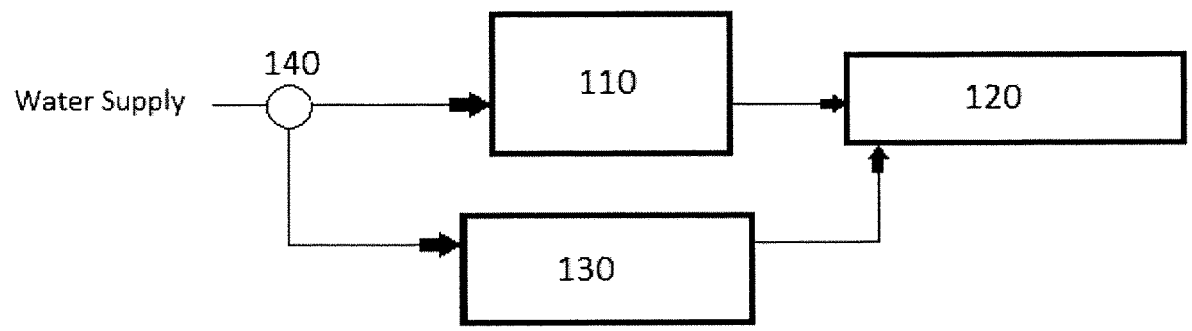
FIG. 3 shows an alternate schematic of water flow for utilizing silver ion release unit and high concentration module.

Disclosed are systems and methods for generating and/or releasing silver ion biocide as well as methods and equipment for calibrating the system and providing quality assurance and quality control operations for the system. The disclosed systems include multiple embodiments and components which are described throughout. It will be appreciated that the various embodiments and components may be arranged, configured, and/or combined in many distinct arrangements depending on the conditions in which the system is deployed and the goals of such deployment. Many embodiments utilize a silver ion release unit 110 for releasing silver ion into a water system 120. This silver ion release unit 110 can take the form of any of the devices for releasing and/or generating silver ion described herein. Additionally, some embodiments comprise a high concentration silver module 130. The high concentration module 130 may also take the form of any of the devices for releasing and/or generating silver ion. The effluent of the high concentration module 130 contains a higher concentration of silver ion than the effluent of a silver ion release unit 110.

Additional embodiments disclosed herein relate to systems and method for treating and monitoring and controlling water quality as well as methods and equipment for calibrating the system and providing quality assurance and quality control operations for the system. The disclosed system includes multiple embodiments and components which are described throughout.

Disclosed are multiple potential methods for introducing a low concentration of silver ion into a water system. These low concentration techniques typically result in about 100 µg/l to about 1,000 µg/l of silver ion. Low concentration techniques may be used to create a silver ion concentration of least about 200 µg/l, about 300 µg/l, about 500 µg/l, about 700 µg/l, or about 800 µg/l. Low concentration techniques may also be sued to create a silver ion concentration of not more than about 1,200 µg/l, about 1,100 µg/l, about 900 µg/l, about 800 µg/l, about 700 µg/l, about 500 µg/l, about 400 µg/l, or about 300 µg/l.

There are also techniques disclosed for creating a high concentration of silver ion in a water system. These high concentration techniques result greater than 1,000 µg/l of silver ion in the effluent of the high concentration silver module. In some embodiments, the disclosed high concentration techniques may be used to generate a silver ion concentration of at least about 1,000 µg/l, about 1,300 µg/l, about 1,500 µg/l, about 1,700 µg/l, or about 2,000 µg/l. In these embodiments, the disclosed high concentration techniques may be used to generate a silver ion concentration of less than about 1,000 µg/l, about 2,000 µg/l, about 5,000 µg/l, about 7,000 µg/l, or about 10,000 µg/l.

In disclosed embodiments, the silver ion concentration may be adjusted through any of the disclosed embodiments. The silver ion concentration may be adjusted in response to many signals, including but not limited to, measured silver ion concentration, measured concentration of other analytes, determined water contamination, determined levels or bacterial, fungal, and/or microbial contamination. In preferred embodiments, water contamination is determined through online periodic or continuous monitoring although offline testing may produce results which indicate the silver ion concentration should be adjusted, potentially manually.

Certain embodiments include a microbial contamination detector which may utilize any known method of detection microbial contamination including, but not limited to bioluminescence, fluorescence, flow cytometry, cell culturing, solid-phase scanning, incubation, staining, and electrochemical methods. If microbial, bacterial, or fungal contamination is determined to be out of an acceptable range, the silver ion may be adjusted in response.

Electrochemical Approach to Silver Ion Generation

There are many potential methods of introducing a concentration of silver ion into a water stream. The electrochemical generation of silver ion may be performed within a water stream or water supply using an electrochemical silver ion generator 240. This method involves two or more electrodes within an electrolyte, separated by a controlled and/or defined distance. The electrodes are composed of an anode of silver or silver alloy, and may include other metals or materials, opposed by a cathode of non-metallic or metallic materials including silver. Preferred embodiments utilize a flowing stream of water running between the two electrodes in order to sweep silver ions downstream and prevent the re-plating of silver ion from the anode onto the cathode. These electrodes may be arranged and housed in a variety of configurations. The two silver electrodes separated by a controlled and/or defined distance create a cell. As current is applied to the cell, silver ion ($Ag^+$) is generated and carried away with the water stream.

Controlled Release Controlled Solubility Approach to Silver Ion Generation

Another method of releasing silver ion in a water stream is the use of metal oxides, carbonates, and salts containing silver. These metal salts may include, but are not limited to, metal oxides, metal halides, or metal salts containing silver, and/or metallic silver, or a combination, mixture or alloy of metals containing silver. In some embodiments, the silver containing material may include silver bromide, silver chloride, silver iodide, silver fluoride, and/or silver phosphate. It will be appreciated that, while this solid-phase reagent method is generally described using silver chloride as an exemplary silver ion source, a wide array of metal oxides, carbonates, and/or salts containing silver may be used, including, but not limited to those material shown in Table 1 below. Indeed, more water soluble metal salts containing silver may be preferable to silver chloride under certain conditions.

TABLE 1

Selected Candidate Materials for Controlled-Release Silver Biocide Units

| Compound | Ksp | Max Theoretical Conc (ug salt/L) | Effluent Conc. Range Packed Bed (ug $Ag^+$/l) |
|---|---|---|---|
| Silver Metal | na | <50 ug/l | <50 ug/l |
| Silver Bromide | $5.40 \times 10^{-13}$ | 140 ug/l | 5-100 ug/l |
| Silver Chloride* | $1.77 \times 10^{-10}$ | 1,900 ug/l | 200-800 ug/l |
| Silver Phosphate | $8.89 \times 10^{-17}$ | 6,500 mg/l | 500-2,000 ug/l |
| Silver Carbonate | $8.46 \times 10^{-12}$ | 31,600 ug/l | 4,000-10,000 ug/l** |

*Major forms are gelatinous, cheesy flocculent, pulverulent, and granular crystalline or fused
**Used for High-Concentration Effluent production if required for system disinfection In this method, water is passed through a bed of silver chloride which releases silver chloride into the water stream as it flows through the bed. Effluent from the AgCl bed typically contains about 100 µg/l silver ion, the concentration of which is determined by parameters such as material morphology, temperature, and pH, which are also used to impart increased concentrations as necessary and desirable.

The release of metal oxides, carbonates, and salts containing silver into the water stream may fluctuate with the flow rate, pH, and/or temperature of the water. Preferred embodiments of the disclosed systems include a pH adjustment module 150 used to ensure that the water pH is adjusted to a level that consistently releases the desired concentration of silver ion. The temperature of the water passing through the silver bed may also impact the concentration of silver ion in the water stream. A temperature adjustment module 160 may be used to ensure a consistent temperature of water is being passed through the bed, or the silver bed itself may be configured to produce the desired concentration of silver chloride, and thus silver ion, for a given water temperature.

The silver chloride bed may be housed in a container which has at least one inflow and at least one outflow port. In some alternative embodiments, the AgCl bed material may be contained within porous packets or placed directing into a water storage tank. The AgCl bed itself is comprised of natural or engineered shapes of solid particles of organic and/or inorganic salts, oxides or carbonates containing silver. As water is passed through the bed, silver chloride is released into the water stream resulting in an associated increase in the concentration of silver ion.

The solubility of salts, oxides and/or carbonates containing silver varies with the temperature and pH of the solution. In addition to adjusting the water flow rate, the temperature and pH of the water entering the silver bed may be adjusted in order to optimize silver ion concentration in the water stream. By adjusting these variables, along with the composition of the silver bed itself, varying, pre-selected concentrations of silver ion may be released into a water stream. As discussed, low concentrations of silver ion may be used to maintain a biocidal level of silver ion while high concentrations of silver ion may be beneficial for periodic use in order to reverse or prevent the growth of biofilms or other potential biological contaminants.

Of the materials listed in Table 1, AgBr, Ag3PO4 and Ag2CO3 are preferable based on physical hardness, lack of dusting, and engineerability. A unique composition of crystalline silver chloride and silver orthophosphate that has shown desirable mechanical & chemical properties. This formulation is very close to the maximum mass/volume efficiency that can be produced to put silver into water using a flow-through device. The operational life of this material in a 100 cm$^3$ cartridge is calculated at over 390,000 liters of finished water. At operational flows of 100-150 ml/min, engineered devices using the material can be manufactured to produce effluents targeted to various output concentrations within a range of 300-1,000 μg/l Ag+. In certain embodiments, a cartridge has a volume of about 10 cm$^3$, about 20 cm$^3$, about 30 cm$^3$, about 50 cm$^3$, about 80 cm$^3$, about 100 cm$^3$, about 150 cm$^3$, about 200 cm$^3$, about 300 cm$^3$, about 500 cm$^3$, about 800 cm$^3$, about 1,000 cm$^3$, or about 5,000 cm$^3$.

The baseline composite of fused AgCl-orthophosphate material can be designed to release very specific Ag+ concentrations by using recrystallization methods and production of engineered shapes (pellets, tri-lobes) that operate below the theoretical solubility limit of both silver chloride and silver orthophosphate, which is about 3 mg/l. Some design engineering can be performed to compensate for static periods when no water flow is present and effluent concentrations increase somewhat, but it is not expected to be necessary due to dilution effects and the low void volume of the cartridges in many embodiments. Certain embodiments can be designed with internal design elements to compensate for decreasing volume of material as it is used during operation, without the need to use springs and associated hardware. Silver phosphate and carbonate materials that are higher than the 300-500 μg/l range can also be engineered to decrease solubility by manufacture of engineered shapes that provide only partial access to the soluble species during flow, possibly yielding an additional method to produce cartridges that impart nominal 400 μg/l Ag+. Orthophosphate and carbonate materials can also be used to design high silver concentration modules that could be used for system maintenance in the case of microbial upsets due to mechanical failures of other system components.

Table 2 shows the effluent concentration of Ag+ in certain disclosed embodiments.

TABLE 2

| Composite Silver Chloride/Orthophosphate & Ag$^0$-SPA Materials Tests | | | | | | |
|---|---|---|---|---|---|---|
| COLUMN TESTS | | Silver Biocide Devices | | | | |
| Influent | | Cartridge 1 | Cartridge 2 | Cartridge 3 | Cartridge 4 | Cartridge 5 |
| Ag+ (ug/l) | | <1 | <1 | <1 | <1 | <1 |
| k | | 0.8 | 332.3 | 332.3 | 332.3 | 332.3 |
| pH | | 7.0 | 4.5 | 4.5 | 4.5 | 4.5 |
| Added TOC (as Acetic Acid) | | <2 | 40 | 40 | 40 | 40 |
| Flowrate (ml/min equiv) | 100 100 | 100 | 100 | 100 | 40 | 40 |
| Effluent | | Effluent Ag+ Conc (ug/l) | | | | |
| Throughput (L) | | AS-Cl/PO4-011 | AS-Cl/PO4-012 | IC-Cl/PO4-013 | AS-PO4-014 | AS-Ag$^0$SPA-051 |
| 0.0 | | | | | | |
| 0.1 | | 480 | 505 | 350 | 938 | 256 |
| 0.2 | | 450 | 460 | 327 | 909 | 241 |
| 0.5 | | 422 | 439 | 350 | 905 | 246 |
| 1.0 | | 513 | 422 | 378 | 842 | 224 |
| 2.0 | | 490 | 418 | 383 | 885 | 280 |
| 5.0 | | 455 | 434 | 421 | 897 | 279 |
| 10.0 | | 467 | 465 | 459 | 903 | 302 |
| 20.0 | | 533 | 478 | 463 | 988 | 301 |
| 40.0 | | 429 | 459 | 473 | 954 | 314 |
| 60.0 | | 505 | 465 | 483 | 896 | 289 |
| 61.0 | | 486 | 454 | 502 | 940 | 240 |
| 65.0 | | 476 | 472 | 406 | 945 | 260 |
| 70.0 | | 448 | 419 | 473 | 987 | 248 |
| 74.0 | | 439 | 433 | 485 | 975 | 275 |
| 80.0 | | 501 | 460 | 430 | 938 | 229 |
| 89.0 | | 491 | 462 | 480 | 964 | 264 |
| 96.0 | | 427 | 438 | 449 | 909 | 252 |
| 110.0 | | 453 | 487 | 437 | 983 | 283 |
| 120.0 | | 434 | 513 | 444 | 914 | 296 |
| 122.0 | | 465 | 529 | 452 | 934 | 292 |
| 125.0 | | | | | | |
| Total Run Time 20.5 hours | | | | | | |

Table 3 shows the physical and operational calculations of a preferred embodiment:

TABLE 3

| Physical & Operational Life Calculations (Silver Orthophosphate) | |
|---|---|
| Material Density | 6.37 g/cm$^3$ |
| Packing Density | 0.62 cm$^3$/cm$^3$ |
| Bed Volume | 100.0 cm$^3$ |
| Material Volume | 62.0 cm$^3$ |
| Ag3PO4 Mass | 394.9 g |
| Use % (max, nominal) | 50.0% |
| Max Usable Ag+ | 154 g |
| Nominal Use Concentration | 500 ug Ag$^+$/L |
| Total Throughput | >390,000 L of water to 50% mass loss in cartridge |
| Pressure Drop (150 ml/min) | <1 psid |

FIG. 1 provides additional data relating to the concentration of silver ion in effluent from various silver containing materials as throughput increases.

Resin Exchange Bed for Silver Ion Generation

Still another method of imparting a concentration of silver ion to a water supply is through the use of a silver ion exchange resin bed. It will be appreciated that, a wide array of metal oxides, carbonates, and/or salts containing silver may be used in coordination with an appropriate resin. In this method, water is passed through the silver ion exchange resin bed which releases silver ion into the water stream as it flows through the bed. Effluent from the resin exchange bed typically contains a lower concentration of silver ion, between about 100 μg/l to about 1,000 μg/l silver ion. In certain embodiments, the silver exchange resin bed may be configured so that effluent from the resin exchange bed contains a concentration of silver ion of at least about 200 μg/l, about 300 μg/l, about 500 μg/l, about 700 μg/l, or about 800 μg/l. The silver exchange resin bed may be configured so that effluent from the resin exchange bed contains a concentration of silver ion of less than about 1,200 μg/l, about 1,100 μg/l, about 900 μg/l, about 800 μg/l, about 700 μg/l, about 500 μg/l, about 400 μg/l, or about 300 μg/l.

The release of silver ion into the water stream may fluctuate with the pH and temperature of the water. Preferred embodiments of the disclosed systems include a pH adjustment module 150 used to ensure that the pH of the water stream is adjusted to a level that consistently releases the desired concentration of silver ion. The temperature of the water passing through a resin exchange bed may also impact the concentration of silver ion in the water stream. A temperature control unit may be used to ensure a consistent temperature of water is being passed through the bed, or the resin bed itself may be configured to produce the desired concentration of silver ion for an expected water temperature.

The silver ion exchange resin bed may be housed in a container which has at least one inflow and at least one outflow port. In some alternative embodiments, the exchange resin material may be contained within porous packets or placed directing into a water storage tank. The resin exchange bed itself is comprised of an exchange resin which is pre-treated with silver ion and/or metal oxides or metal salts containing silver.

The exchange resin using in the exchange resin bed may take many different forms depending on the specific operating conditions. Potential exchange resins include, but are not limited to, strong base anion exchange resins, strong acid cationic exchange resins and/or chelating resins. One of skill in the art will understand that many different resins may be used successfully in varying conditions, particularly in deployments in which the pH and/or temperature of the feed stream is adjusted or controlled.

High Concentration Silver Ion Module

Over long term operation, the concentration of silver ion released into the water stream from a low concentration resin exchange bed may decrease as the silver ion is depleted from the exchange resin. When this occurs, many embodiments of the exchange resin bed may be recharged using a high concentration solution containing silver. As an example, a high concentration solution may be formed by passing water through a bed of silver salt or silver oxide crystals or any other high concentration source of silver. Potential high concentration sources of silver include, but are not limited to, silver bromate, silver sulfate, silver oxide, and/or silver carbonate, among others. One potential embodiment of a high concentration silver material includes silver phosphate which, under certain conditions, may impart about 2,000 to about 3,000 μg/l Ag$^+$ to a water solution. In some other embodiments, electrochemical silver ion generation may be utilized in order to generate a high concentration silver ion solution. The high concentration solution may then be passed through the exchange resin bed, thereby increasing the concentration of silver ion in the resin bed. Effluent from the high concentration module will contain silver ion in concentrations dictated by its solubility under the device design and process conditions, and is matched to the requirements of the process in which it is employed. Certain embodiments may contain a separate temperature 160 and/or pH adjustment module 150 upstream of the high concentration module 130.

In some embodiments, the effluent of the high concentration module may have a concentration of silver ions of at least about 1,000 μg/l, about 1,300 μg/l, about 1,500 μg/l, about 1,700 μg/l, or about 2,000 μg/l. In some embodiments, the effluent of the high concentration module may have a concentration of silver ions of less than about 1,000 μg/l, about 2,000 μg/l, about 5,000 μg/l, about 7,000 μg/l, or about 10,000 μg/l.

It will be understood that the configuration of the ion exchange resin bed may be determinative of the ability and/or extent of the resin bed to be recharged by a high concentration silver ion solution. If a low concentration resin beds depends on a silver salt as the source of silver ion, the bed may not be rechargeable using a high concentration silver ion solution. By comparison, if a low concentration resin exchange bed utilizes a cationic exchange resin, the bed may be rechargeable multiple times.

Water System Design

As shown in FIG. 2, in many embodiments of the disclosed systems, controllable valves 140 typically direct water flow through a low concentration silver ion resin exchange bed or another silver ion generation module which is configured to maintain a relatively low concentration of silver ion in a water stream. When a resin exchange bed is to be recharged or the water system is to be treated with a high concentration of silver ion solution, a valve 140 may be activated in order to direct water first through the high concentration module and then either into the resin exchange bed in order to increase the concentration of silver ion in the resin exchange bed or directly into the water system. This valve 140 may be activated manually, by a timer, in response to the measured silver ion concentration being released into the water stream by the resin exchange bed, or by a processor based on a machine learning or other algorithm.

In water systems which do not utilize a resin exchange bed, the high concentration module may be connected directly to the water supply as shown in FIG. 3.

The water flow may be directed through the high concentration module for a predetermined time period or until the resin bed has recharged to a predetermined silver concentration. In certain embodiments, the water flow rate, temperature, and pH may be adjusted in order to optimize the residence time and/or other conditions of the high concentration solution passing through the exchange resin bed.

In addition to using a high concentration silver solution to recharge the exchange resin bed, an output from the high silver concentration module directly to the water system as shown in FIGS. 2 and 3. This configuration may be used in order to periodically treat the entire water system with a high concentration silver solution. Periodically treating the entire water system with a high concentration silver solution may help to prevent microbial growth including biofilm formation throughout the system.

The solubility of many silver containing compounds varies with the temperature and pH of the solution. The water flow rate, temperature, and pH of the water entering the high concentration module may be adjusted in order to optimize the recharge of the exchange resin bed. Additional factors which may impact the concentration of silver ion in effluent and/or in the system as a whole include the total volume of water in the system, the total volume of silver ion-containing effluent, water & device temperature, and the time of interaction allowed between a water flow and a given source of silver ion. In one embodiment, device temperature control (e.g. heating) may be accomplished by heating the media directly by resistance heating, without heating up the entire water stream.

It should be noted that the loss of silver ion from solution in water systems over time is known. In order to create and/or maintain the desired concentration of silver ion certain embodiment may release high concentrations of silver ion into the water system than are ultimately desired. This may be done in order to compensate for the loss of silver ion over time. In certain embodiments, the use of both high concentration and lower concentration silver ion release units may be used in combination in order to reach the desired system concentration of silver ion.

Water Stream pH and Temperature Adjustment Modules

The pH and temperature of a water stream may be adjusted prior to the use of any of the methods described above for introducing silver ion biocide into a water stream. The water stream may be directed through a pH adjustment unit 150 which directs the water stream through a solid-phase pH adjustment bed to adjust the pH of the water stream. The solid-phase reagent bed may take many forms but is typically an inorganic solid. A temperature adjustment module 160 may utilize known heating and/or cooling technologies and may be housed as an individual flow-through module or a heated biocide device housing.

While the pH adjustment module 150 is generally described in terms of an acidic module or acidifier, used for lowering the pH of the water stream, it will be understood that disclosed embodiments of the pH adjustment module may be used to raise, lower and/or neutralize the pH of the water stream depending on the pH of the stream prior to entering the pH adjustment module 150. Certain embodiments may be used to adjust the pH of the water stream closer to neutral.

When utilizing a pH lowering module, the solid-phase acid materials, when hydrated, form metal-hydroxy compounds with the generalized formula M-O-H. The acidic behavior of this group is largely determined by the size, electron configuration and charge (oxidation state) of the metal atom. If the metal atom has a high charge and small size, the metal atom draws electrons toward it, strengthening the M-O bond and weakening the O—H bond. This causes the hydroxy compound to dissociate as an acid, resulting in a proton and a metal oxide anion. Solid-phase acid materials include, but are not limited to, tungstic acid, tungsten oxide, tungsten acid-H2WO4 cupric oxide and/or phosphoric acid, molybdic acid, molybdenum oxide, molybdic acid-ammonium dimolydate, polymeric acids.

When utilizing a pH adjustment module 150 to raise or neutralize the pH of the incoming water stream, many useful materials are known in the art, including, but not limited to, zinc oxide, magnesium oxide, magnesium hydroxide, calcium carbonate, calcium hydroxide, sodium bicarbonate, and sodium sesquicarbonate.

Figure 4:
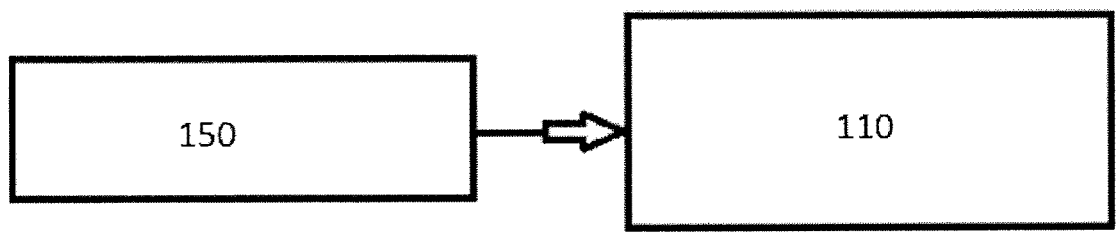
FIG. 4 shows a pH adjustment module upstream of a silver ion release module.

The pH adjustment module 150 will typically be configured as an independent flow-through module which may be easily inserted into a water supply system as shown in FIG. 4.

A pH adjustment module will typically be deployed shortly upstream to a silver ion release module. In this configuration, the pH of the water entering the silver ion release module can be closely controlled in order to optimize the release of silver ion.

Figure 5:
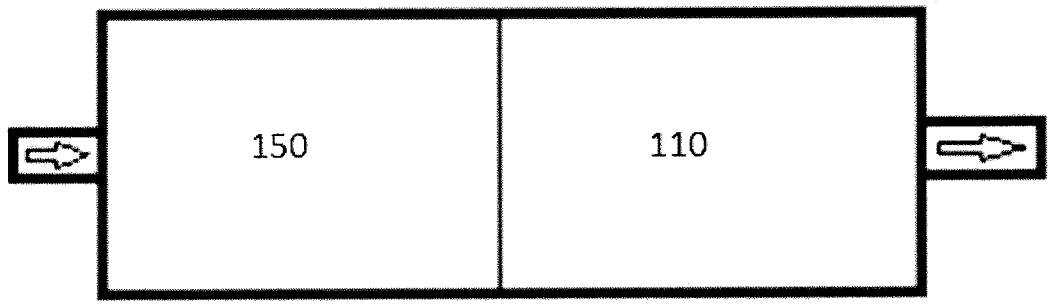
FIG. 5 shows a pH adjustment module and a silver ion release module embedded in the same housing.

In certain embodiments, a pH adjustment module and silver ion release module may be housed within a single housing as shown in FIG. 5. In this configuration, the total part count of the water system may be reduced and replacement of the single pH adjustment and silver ion release unit may be simplified. In certain embodiments, the specific materials utilized in such a combined unit are selected such that the operational lifetime of both the pH adjustment portion and the silver ion release potion are about equal under the anticipated operating conditions.

The operational lifetime of the pH adjustment module is typically dependent on the pH of the incoming water stream, flow-rate, total throughput, and specific pH adjustment materials utilized. Some solid-phase materials, such as polymeric acids, may be regenerated using acid generated from an electrolytic process, thereby extending the operational life of the pH adjustment module under certain circumstances. In certain embodiments, acid or base generated from an electrolytic process may also be used as an alternative to the solid-phase pH adjustment material.

Figure 6:
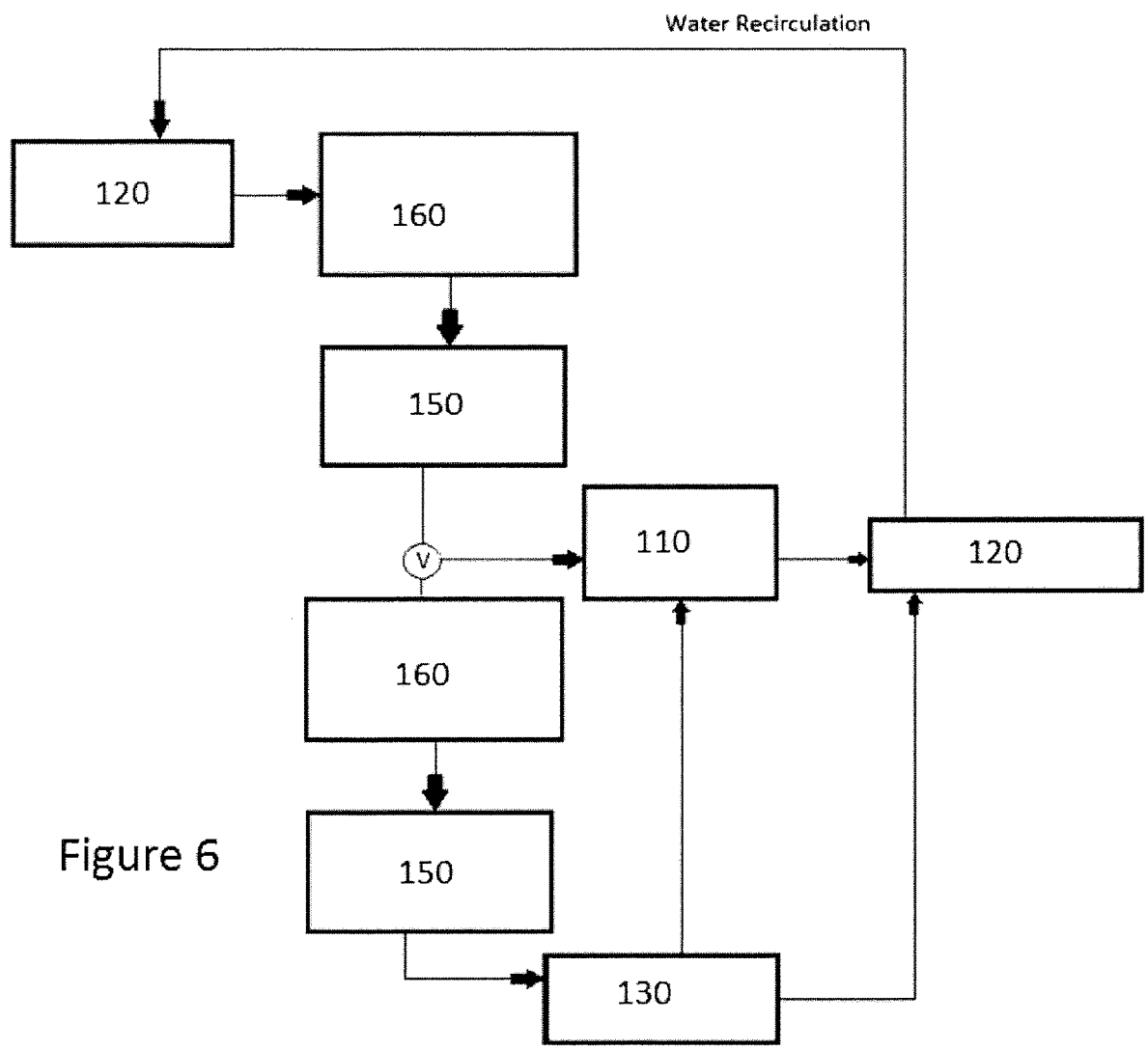
FIG. 6 shows a schematic of a potential recirculating water system utilizing a silver ion release unit and a separate high concentration module, each with temperature and pH adjustment modules.

FIG. 6 shows one potential embodiment of the disclosed water system including a separate temperature and pH adjustment module. It should be noted that increased system temperature may increase the effectiveness of silver ion as a biocide for a given concentration. Higher temperatures may also help to prevent the deposition of silver ion onto components of the water system and thereby reduce the total loss of silver ion in the water system. By incorporating at least one temperature adjustment module 160 throughout a water system the effectiveness and conservation of silver ion biocide within a water system may be optimized. In certain embodiments, multiple temperature adjustment modules 160 may be incorporated in order to maintain a consistent temperature throughout the system or in order to create distinct temperature zones. For example purposes only, a first temperature adjustment module 160 may be used to maintain a first temperature throughout the water system in general while a second temperature adjustment module 160 may be used to raise or lower the water temperature prior to the water entering a silver ion release module. In certain embodiments, a third temperature adjustment module 160 may be positioned shortly upstream of the point the water is actually used for a given purpose. My utilizing multiple temperature adjustment modules 160, temperature may be used as an additional tool for optimizing the overall performance of a silver ion biocide water system. It will be understood that a similar series of pH adjustment modules may also be used to form separate zones of higher and lower pH within a given system. It is also understood that increased temperature may also improve biocidal performance of the metal ions at given concentrations, and provide contact disinfection.

As shown in FIGS. 6 and 7, some disclosed water systems utilize a recirculating water supply. In some of these embodiments, the water stream will be continuously treated and adjusted with regard to silver ion concentration as well as pH and temperature. In these embodiments, the water stream entering the silver ion generation unit may require little if any additional silver ion. Similarly, the water in these embodiments will typically require less adjustment of the pH and/or temperature when compared to non-recirculating systems.

As shown in FIG. 7, certain embodiments of the disclosed system utilize separate temperature and pH adjustment modules for conditioning the water stream prior to entering a high concentration silver ion module. These separate temperature and pH adjustment modules may be beneficial for activating certain chemistries within the high concentration silver ion release module.

It should be noted that less than the full water stream may be directed through a given temperature adjustment module 160, pH adjustment module 150 and/or silver ion release module 110. In certain embodiments, only a small portion of the total volume of circulating water may be directed through a temperature 160 and/or pH adjustment module 150 before entering a silver ion release module 110. This small portion of water may then be combined with the total circulating water supply and will diffuse silver ion throughout the system.

Measurement of Silver Ion Concentration and QA/QC

Precise control of the concentration of silver ion in a water stream depends in part on accurate measurement of the silver ion concentration. Potential embodiments include an analyzer 210 and/or controller 230 which utilizes a method such as colorimetric analysis method, spectrophotometric analysis method, potentiometric, or voltammetric technique (including but not limited to anodic stripping voltammetry, "ASV"), or a combination of methods in order to analyze silver ion concentration. The disclosed voltammetric techniques typically performed using a voltammetric detector 220 which is operably connected to the analyzer 210 or controller 230. In preferred embodiments, the detector 220 is embedded in the analyzer 210. Voltammetric techniques comprise the steps of pre-concentrating the desired analyte (Ag+) onto an electrode surface at a level consistent with the desired analytical range. The pre-concentration step is followed by application of a differential pulse or square waveform to the electrode, thereby stripping the pre-concentrated analytes from the electrode surface back into solution. The potential at which the analyte is stripped provides selectivity, while the current consumed is accurately measured to give the concentration.

The maximum accuracy of the voltammetric ASV technique has been demonstrated for most metal analytes to be about 5%, equivalent to atomic absorption. Many embodiments target an overall error level of less than 10% within 95% confidence limits. This provides a safe margin of error for the biocide level maintenance. The ASV technique is highly sensitive (sub-ppb analyses are feasible if needed) due to the pre-concentration step, which accumulates the analytes contained in a sample onto a small area electrode resulting in an extremely favorable signal-to-background ratio. In a flow-through configuration, high sensitivity can be attained since analyte can be accumulated on the electrode 225 over any amount of time needed, especially in highly finished water that has low or substantially no levels of potential interferents. The technique functions by extracting analyte from a bulk solution onto a detector electrode 225; the concentration of analyte onto the electrode 225 is typically 100-1,000 times the analyte's concentration in solution.

Certain embodiments of the methods and systems described include built-in autocalibration and QA/QC using co-deposited metals from solid phase calibration standards 250. In certain embodiments, electrochemical techniques of introducing silver ion, can be used for on-demand generation of known quantities of Ag+ ion for use as a calibration standard and co-analytes that can be used in QA/QC samples. This design is a two half-cell configuration for electrochemical silver ion generation that can be used to produce calibration standards and QA/QC samples on-demand. As an example, nickel-silver alloys may be used as these alloys are materials whose electrolytic behaviors are well-understood. This combination of metals is also advantageous since both metals can be analyzed by analyzers 210, such as the disclosed Ag-SEMS Detector.

A measured decrease in the concentration of both metals simultaneously may be attributed to a decrease in detector response, which can automatically initiate an electrode cleaning cycle and re-calibration. In comparison, a decrease in the ratio of silver concentration vs nickel concentration suggests silver depletion in the water stream. This analysis can then be used to increase silver ion concentration in the water stream through any of the methods discussed.

In certain embodiments, this type of internal standard co-analyte may be contained within the housing of any of the silver ion delivery devices discussed. The electrical and chemical techniques used to release silver ion in a water stream may also be used to release a co-analyte such as a slightly soluble copper salt or oxide which may be used to validate the response of detector electrodes. As discussed above, the secondary metal provides a method for QA/QC as the secondary analyte may be selected to be less or not substantially susceptible to plating out or otherwise being lost from solution as compared to silver ion. If the secondary analyte is not detected or is detected at a concentration other than what is expected, this indicates that the analyzer 210 is not functioning properly. As discussed, this method may also be used to calibrate the response of an electrode and detector assembly 220 and may be the basis for manually and/or automatically compensating for drift in detector 220 response during operation. It is also understood that a secondary metal, such as copper, can be used to improve biocidal performance of the device. In certain embodiments, such as, for example, those comprising copper ion as a secondary metal ion, which contain a biocidal agent in addition to silver ion, the concentration of silver ion needed to be an effective biocide may be reduced, depending on the species and concentration of the additional biocidal agent utilized.

By utilizing precise measurement of the silver ion concentration at single or preferably multiple points throughout a water system, action may be taken in order to achieve and maintain the desired concentration. If silver ion concentration is decreasing, a portion of the water stream may be circulated through a silver ion releasing module in order to combat this decrease. Any of a series of corrective actions may be taken in order to ensure the desired concentration of silver ion in a system. As the loss of silver ion over time is known, utilizing a combined silver ion concentration measurement device and a silver ion release module may be beneficial for maintaining the desired concentration and effectiveness of silver ion biocide.

Certain embodiments include at least one and often more than one processor, analyzer 210, or controller 230 which monitors the silver ion concentration at at least one and often multiple points throughout a water circulation system. In these embodiments, the processor may respond to a decrease in silver ion concentration by adjusting the flow rate, flow path, total throughput, temperature, and/or pH of water in the system in order to release the desired amount of silver ion into the water system. By directing more or less water through a low concentration and/or high concentration silver ion release module, and adjusting the water temperature and/or pH, the precise amount of silver ion released into a water system may be controlled to a high degree. The loss of silver ion from solution in water systems over time is known. Disclosed embodiments may be configured to release higher effluent concentrations than the targeted aqueous concentration to compensate for this phenomenon. In some cases, a combination of high and low concentration beds may be used to ensure adequate biocide concentrations. By using the disclosed systems and methods, individually or in combination, the operational performance and operational life of a silver ion biocide system may be improved. In certain embodiments, the controller 230 may record silver concentrations to a database and adjust the actions taken in response to a measured silver concentration over time. In preferred embodiments, the controller 230 will utilize a machine learning algorithm.

Electromechanical Design

The design of some embodiments of the disclosed analyzer may be small. The disclosed designs allows for automated calibration and quality control sample analysis over long operational periods. In many embodiments, this process approach does not require expendable liquid reagents for operation. For wastewater or heavily contaminated streams (e.g. urine brine) external probes or remote detectors can be deployed to increase reliability.

Disclosed embodiments may include inexpensive, rugged, and highly reproducible devices that function well in quite harsh environments such as metals smelters, oil rigs, remote outposts, and lead-acid battery manufacturing plants.

Feedback & Remote Process Management

Feedback & Process Management capabilities are integrated into the disclosed analyzer 210 designs. These capabilities may allow automatic response to variations in system performance. Development and optimization of these capabilities creates the capability to adapt the analyzer 210 platform to varying analytical needs. Compositions in the makeup of water for both dynamic water recovery systems and passive storage tank environments can be controlled using data obtained from certain disclosed embodiments. To that end, a feedback and control loop may be integrated into an instrument embedded controller and a software control methodology may be utilized.

Remote Process Management opportunities are increased significantly over current technology, as at least some of the disclosed electrodes 225 are capable analyzing multiple analytes. Using the described electroanalytical techniques, specificity may be obtained by applied electrolytic conditions and software variations that allow the user to, for example, differentiate and quantify multiple analytes on a single electrode 225 scan.

Smart Electroanalytical Multi-Sensor Analyzer for Silver Ion Biocide

Some disclosed embodiments relate to a Smart Electroanalytical Multi-Sensor (SEMS) for analysis and process control of biocidal silver ion in potable water.

A preferred embodiment of the disclosed analyzer is identified as Ag-SEMS5500, is designed to measure Ag+ in the 50 ug-5,000 µg/l range at sample intervals which may be selected by the user and/or automatically determined by embedded machine learning algorithms. It will be appreciated that, while many embodiments are described in the context of the SEMS-5500 device or the M394-SEMS ASV, the disclosed embodiments may additionally and/or alternative utilize similar devices components, and/or methods and are not limited to any particular brand or device model.

The disclosed embodiments may have the capability to analyze Ag+ concentrations at multiple locations in the system simultaneously or in sequence, and automatically provide continuous and on-demand maintenance of Ag+ ion biocide levels in water systems 120. The design provides near-real-time Ag+ concentration vs time, throughput data, and a profile of total silver added to the system over time via multiple data output protocols. Some embodiments are intended for long-duration, unattended operation and will incorporate auto-calibration and QA/QC functions that are automatically enabled during operation via both pre-programmed parameters and auto-sensing machine-learning algorithms.

Some disclosed analytical methods are based on voltammetric techniques that function by accumulating and analyzing silver ions with high specificity onto solid-state electrodes 225, followed by application of specific waveforms to quantify desorption of the analyte(s) of interest; after analysis, the Ag+, or other analyte, is released back into the water system 120, resulting in no loss of Ag+ biocidal capability and no exposure of the water stream to any toxic or hazardous materials.

Figure 12:
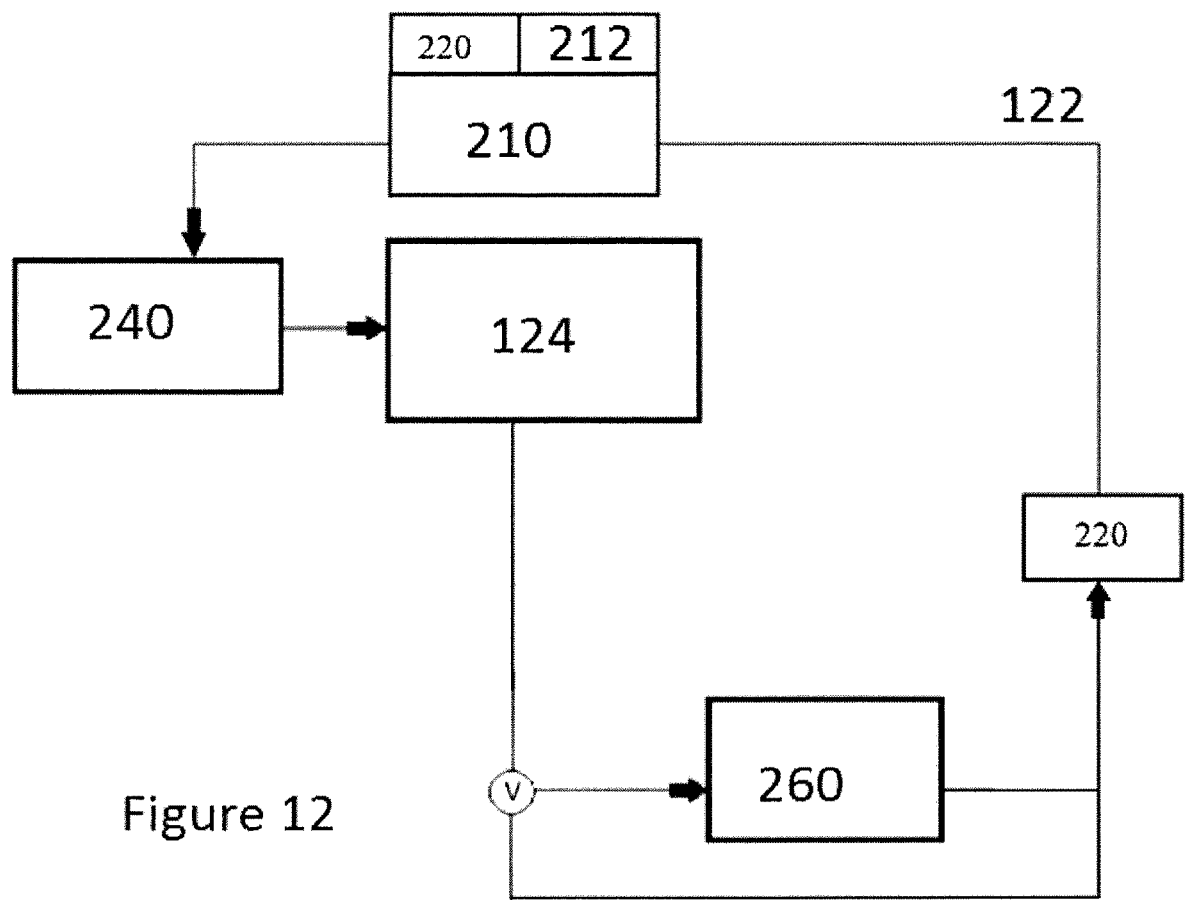
FIG. 12 shows one potential embodiment of the disclosed system water.

FIG. 12 shows one potential embodiment of the disclosed system including a detector 220 and a remote detector 220 in addition to other disclosed components. A preferred embodiment incorporates two voltammetric detectors 220 that can be operated in parallel or in series, a silver ion generator 240, a controller 212 consisting of an analog PCB capable of sub-nanoamp voltammetric measurement and a digital microprocessor that provides operational control, bi-directional communications, including Ag+ ion generator control, on-board data storage, and an optional touchscreen display.

The measurement range can be adjusted by the user due to the pre-concentration of analyte on the electrode surface. Certain embodiments include additional remote detectors 220 away from the main instrument to obtain a profile of what is happening in the overall system in near-real-time (<5 minutes) on a continuous basis.

In certain embodiments, the controllers 212 are designed with the capability to operate multiple detectors 220 each. Controllers 212 may be arranged to operate Ag+ ion generator 240 as well. This configuration provides operational flexibility, i.e. via a multiply-redundant measurement of one critical parameter (such as Ag+ concentration), simultaneous analysis of multiple sample sites per instrument, or three different analyte measurements with the same instrument. Reagentless design and integrated autocalibration and QA/QC are provided.

Disclosed embodiments may selectively detect biocidally active silver. Differentiation of free ion vs colloidal or total silver allows selective measurement of biocidally-active silver ion. As colloidal or total silver is not biocidally active, inaccurate differentiation can lead to confounding data which does not directly indicate the presence of biocidally active silver ion. Misinterpretation of such data may lead to an insufficient concentration of silver ion and thus lead to a contaminated water system.

Many disclosed embodiments do not rely on hazardous materials, such as mercury, for detection of silver ion. Disclosed embodiments, may be suitable for finished water measurement or measurement of water treated by a conventional municipal water purification plant. External ionic strength adjustment or buffering is not required for disclosed embodiments to detect silver ion and/or determine the concentration of silver ion in most conditions.

Many embodiments are suitable for launch conditions. These embodiments contain no or very few major moving parts and possess low hardware mass/volume/power. The disclosed design requires little maintenance and can operate for extended periods of time.

Some Disclosed embodiments are not impacted by gravity and do not rely on gravity to function or require a net sample. Thus no water is lost from the water system while disclosed embodiments, monitor, analyze, and/or control the concentration of silver ion or other metal ion in the water system.

Some disclosed embodiments produce sensitive and repeatable measurements. Preferred embodiments show less than 8% relative standard deviations (rsd) at silver concentrations between 100 and 1,000 µg/l. Alternative embodiments show less than 10% rsd, less than 15% rsd, or less than 20% rsd at similar silver concentrations. Certain embodiments are capable of measuring, analyzing, and controlling silver ion concentrations as low as 1,000 µg/l, as low as 500 µg/l, as low as 100 µg/l, as low as 50 µg/l or even lower. Embodiments are also capable of measuring, analyzing, and controlling silver ion concentrations as high as 1,000 µg/l, as high as 2,000 µg/l, as high as 3,000 µg/l, as high as 4,000 µg/l, as high as 5,000 µg/l or even higher.

Preferred embodiments contain an optional embedded auto-calibration unit 410 and/or an embedded quality assurance/quality control unit 420. Preferred embodiments are versatile, utilizing broad-spectrum analysis and a common platform. This allows the system to be adapted to changing analytical requirements.

Preferred embodiments utilize the voltammetric technique, anodic stripping voltammetry ("ASV"). This technique comprises the steps of pre-concentrating the desired analyte (Ag+) onto an electrode surface at a level consistent with the desired analytical range. The pre-concentration step is followed by application of a differential pulse or square waveform to the electrode, thereby stripping the pre-concentrated analytes from the electrode surface back into solution. The potential at which the analyte is stripped provides selectivity, while the current consumed is accurately measured to give the concentration.

Some embodiments, solid phase calibration standards 250, and/or solid phase reagents 225 include sparingly-soluble metal salts and oxides and other forms of the controlled-release materials. Some embodiments utilize co-deposited metals from solid phase calibration standards 250.

Many disclosed embodiments utilize square wave anodic stripping voltammetry (SWASV) on mercury-free electrodes 225. SWASV is a large-amplitude differential technique in which a waveform is composed of a symmetrical square wave superimposed on a base staircase potential is applied to the working electrode. The current is sampled twice during each square wave cycle, once at the end of the forward pulse and once at the end of the pulse. Since the square wave modulation amplitude is very large, the reverse pulses cause the reverse reaction of the product, (e.g. $Ag^\circ == Ag+ +e-$). The difference in the two current measurements is plotted against the base staircase potential. The resulting voltammogram peak is symmetrical about the half-wave potential for the reaction, and the peak current is proportional to the concentration. In addition to the square wave technique, differential pulse and other scanning techniques known in the art may be utilized.

In addition to the square wave technique, other scan methods are suitable for this application depending on the conditions. FIGS. 13 and 14 show peaks without showing any interferences at the lower ionic strengths tested.

In tested scanning methods, the current response is dependent upon the quantity of metal. Peak characteristics are related to the speed of the redox reaction of interest, which in the case of most metals is quite rapid, allowing fast sample analysis (a few seconds) at ppt (ng/l) through ppm (mg/l) concentration levels. Pre-concentration times are typically 1-5 minutes. The sensitivity increase compared to other analytical methods, such as XRF, fluorescence, spectrophotometric, LIBS, etc., is due at least in part to the fact that the net current is larger than either the forward or reverse currents (i.e. it is the difference between them); coupled with the disclosed detector design elements that enable effective discrimination against the background current. In preferred embodiments, ASV detection limits near $1 \times 10^{-8}$ M can be attained. As mentioned previously, deoxygenation is not necessary with many embodiments using the disclosed technique as it is with previous electrochemical techniques. This simplifies the approach over current commercial lab methods. Further, many embodiments of the disclosed detector 220 design does not rely on hazardous or toxic electrode materials. In many embodiments, the reference is a solid-state non-Ag/AgCl electrode, which is designed to prevent secondary contamination of the sample.

Disclosed embodiments are capable of very long operational life and enable automated, unattended operation. In order to achieve optimum performance within these parameters, electrolytic cleaning routines may be embedded in the software.

Certain embodiments may be provided with the capability for mechanical polishing of electrodes 225, but mechanical polishing is rarely if ever needed in highly-finished water applications. Due to the highly-finished nature of the water in such applications, there are very low probabilities for potential interferences or compounds such as oils or large surfactants that could change the behavior of the electrodes.

Certain detector 220 embodiments incorporate design features that facilitate voltammetric analysis in low ionic strength aqueous solutions. Some testing was performed to measure current response as solution conductivity decreased, and these data showed that the peak formation was good but some sensitivity is lost as ionic strength decreases due to the increasing background current. This is well-understood behavior and a method has been baselined to compensate for low-conductivity solutions.

Calibration and Quality Assurance Quality Control

Certain preferred embodiments include integrated auto-calibration, auto-diagnostic, and Quality Control/Quality Assurance protocols. In these approaches, the addition of tracer metals other than silver can also be employed to validate detector 220 function over long operational lives.

Additional Metal Controlled Release Cartridge Such as Solid-Phase Reagents

At least one additional metal may be included in a solid phase reagent controlled-release cartridge 260 design embodiment. In such embodiments, this is used as one of the key features of the automated QA/QC protocols that are written into algorithms, such as machine-learning algorithms, for optimizing instrument performance. These algorithms may identify, for example, that a decrease in concentration of both metals simultaneously can be attributed to a decrease in detector response, which can automatically initiate an electrode cleaning cycle and re-calibration, whereas a decrease of, for example, silver vs nickel concentration can be immediately validated as silver depletion in the water stream and then be used to increase silver production in the silver ion generator. In many embodiments, the cartridge 260 will be similar or smaller than the commercial Solid-Phase Reagents version and may be easily integrated into the disclosed detector 220 or analyzer 210 device. These cartridges 260 are typically sized for multi-year operational lives and are chemically and physically stable. In addition to nickel, lead, cadmium, copper, zinc, arsenic, selenium, and various salts thereof may be suitable for analysis by the disclosed device and thus may potentially be used for calibration and QA/QC efforts.

As discussed above, certain embodiments of the disclosed system will have an option to integrate the disclosed silver biocide device into an analytical platform for measuring silver. One approach for achieving this integration is the use of copper salt that releases $Cu^{++}$ ion from the device, which has the dual benefit of adding another biocidal species ($Cu^{++}$) and providing an internal calibration check and QA/QC tool for the electrodes used to measure $Ag^{++}$. The ability to differentiate behavior between $Ag^+$ and $Cu^{++}$ (e.g. silver is easily dissipated in water systems whereas copper is not) can provide an analytical tool which may be helpful for quantifying system performance and differentiating between a condition where silver is being lost vs a condition where the analytical detector sensitivity is decreasing. This will allow some embodiments to conduct self-diagnostics. Copper (II) Phosphate, which in aqueous solution will become the hydrated species $Cu_2(PO_4)OH$, occurs naturally as the mineral libethenite. Anhydrous copper(II) phosphate may be prepared by high-temperature reaction between diammonium phosphate and copper(II) oxide. Triclinic crystals may be produced from this reaction, and either mixed with or pressed into the engineered shapes containing the silver biocide materials.

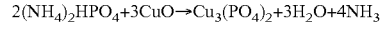

$2(NH_4)_2HPO_4 + 3CuO \rightarrow Cu_3(PO_4)_2 + 3H_2O + 4NH_3$

The disclosed bimetallic design feature can be executed using a number of other co-analytes besides copper. Certain desirable features of co-analytes are that they be measurable using a silver ion measuring platform, that they be non-toxic, and/or otherwise compatible with the water recovery system components.

Electrolytic Silver Ion Generation

The silver ion generator 240 component can also be used for on-demand generation of known quantities of $Ag+$ ion for use as calibration standards and co-analytes that can be used in QA/QC samples. This technique has a great deal of utility and can be performed automatically in preferred embodiments. The design is a two half-cell configuration for $Ag+$ ion generation that can be used to produce calibrations standards and QA/QC samples on-demand. The controller 212 has an accurate digital to analog conversion ("DAC") capability that allows control of the electrolytic environment of the silver anode, and the co-oxidation of QA standards can be performed simultaneously.

Nickel-Silver alloy are materials whose electrolytic behavior is well-known. This combination of metals is advantageous since both metals can be analyzed by preferred embodiments of the disclosed analyzer. As with the solid-phase QA/QC approach discussed herein, a decrease in concentration of both metals simultaneously can be attributed to a decrease in detector 220 response, which can automatically initiate an electrode 225 cleaning cycle and re-calibration, whereas a decrease of silver vs nickel concentration can be immediately validated as silver depletion in the water stream which can be used to increase silver production in the silver ion generator 240. Preferred embodiments are composed of a dual-chamber electrochemical cell with a silver anode and platinum cathode, separated by a membrane. Test data indicates that the precise control of the electrolytic process provides repeatable, predictable silver ion output.

Fluidics Design

The fluidics design is highly flexible. The voltammetric detectors 220, autocalibration and QA/QC and silver generation methods can all be scaled to any size needed.

A single-piece fluidics module may be fabricated using engineering thermoplastics that are highly suitable for pure water and potable water applications. The connecting components and fittings are preferably chromatography-grade. The capability to conduct both local and remote analysis simultaneously may be built into the design of certain embodiments. The size and scale of the flow channels does not directly impact the sensor/detector embodiments described. One of ordinary skill will understand that slight modifications of the disclosed device will have to be made depending on the throughput requirements. The disclosed embodiments may be manufactured in a wide variety of configurations for installation directly in a process stream or to accommodate the use of either internal or remote detectors 220.

Analytical Performance and Results

Analytical performance tests have been performed to evaluate the disclosed devices and methods. A high degree of performance was demonstrated at silver ion concentrations from 50 µg/l through 2000 µg/l, with quantifiable outputs down to about 10 µg/l. Representative scans that were conducted to evaluate lower limits of quantitation and bracket the critical measurement range are shown in FIGS. 13 and 14.

Figure 15A:
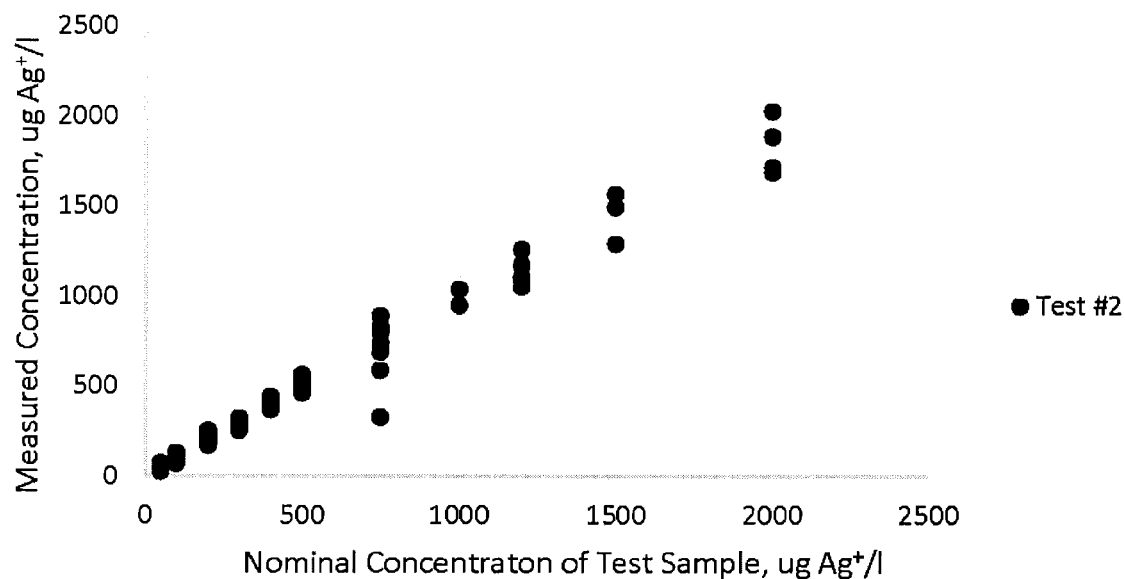
FIGS. 15A and 15B show plots of performance data in a finished water supply.
Figure 15B:
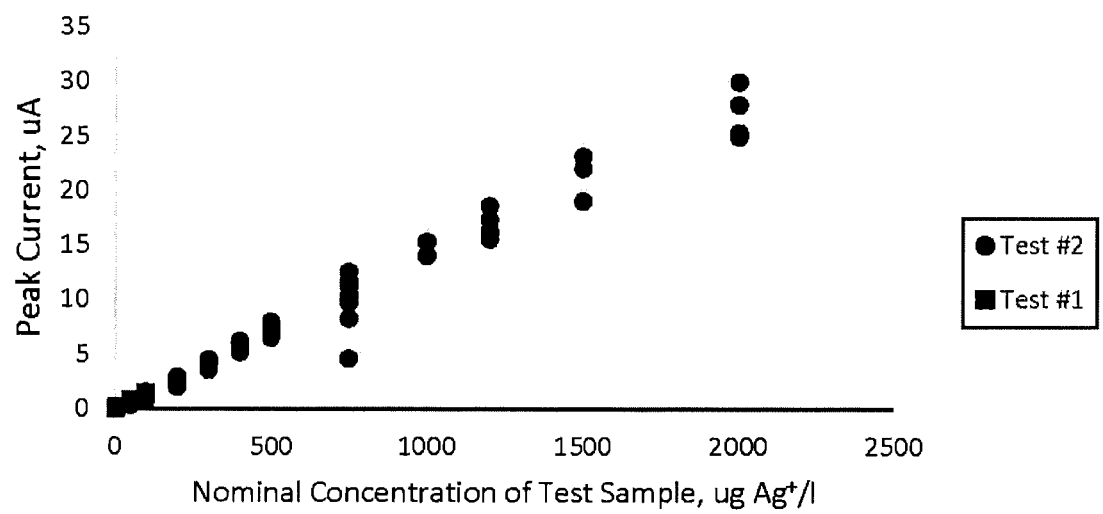

The test data, as summarized in FIGS. 15 A and 15B and Tables 4 and 5 below, shows high degrees of reproducibility, and <10% overall error for the specified measurement range. The high degree of linearity through the 100 µg/l to 1500 µg/l range is achieved by varying the pre-concentration time during the analysis (from 1-5 minutes, in these tests). This is the type of capability that an analyst can provide in the laboratory, and/or that a machine-learning algorithm can be designed to provide anywhere. This may increase analytical performance, particularly outside normal operating conditions where good diagnostic data could be valuable.

TABLE 4

Peak Currents- Scan
Data LoQ Test (Remote Detector Configuration)

| Sample Number | Conc ug Ag+/l | Peak nA |
|---|---|---|
| Ag1-018 | 0.0 | 0 |
| Ag1-012 | 5.0 | 255 |
| Ag1-013 | 5.0 | 240 |
| Ag1-014 | 5.0 | 237 |
| Ag1-015 | 5.0 | 188 |
| Ag1-021 | 50.0 | 858 |
| Ag1-022 | 50.0 | 781 |
| Ag1-023 | 50.0 | 726 |
| Ag1-024 | 50.0 | 783 |
| Ag1-025 | 100.0 | 1482 |

TABLE 5

Peak Currents - Scan
Test # 2 Data (SEMS Remote Detector Configuration)

| SAMPLE NO. ELSA- | Nominal | SAMPLE CONCENTRATIONS | | STATISTICAL ANALYSIS | |
|---|---|---|---|---|---|
| | | EPA 200.8 ICP-MS | M394-SEMS ASV | EPA200.8 ICP-MS | M394-SEMS ASV |
| | | Concentration, ug Ag+/l | | Variance | |
| 160729-070 | 0.0 | 0 | ND@1 | ND@1 | 0.0% | 0.0% |
| 160729-078 | 0.0 | 0 | ND@1 | ND@1 | 0.0% | 0.0% |
| 160729-100 | 0.0 | 0 | ND@1 | ND@1 | 0.0% | 0.0% |
| 160729-008 | 5.0 | 50 | 125 | 73.71 | 150.8% | 47.4% |
| 160729-017 | 5.0 | 50 | 31.8 | 46.29 | −36.3% | −7.4% |
| 160729-018 | 5.0 | 50 | 153 | 56.57 | 205.2% | 13.1% |
| 160729-019 | 5.0 | 50 | 114 | 50.57 | 127.4% | 1.1% |
| 160729-025 | 5.0 | 50 | 128 | 27.43 | 155.6% | −45.1% |
| 160729-039 | 5.0 | 50 | 127 | 42.00 | 153.8% | −16.0% |
| 160729-042 | 5.0 | 50 | 129 | 37.71 | 157.4% | −24.6% |
| 160729-069 | 5.0 | 50 | 132 | 42.00 | 164.0% | −16.0% |
| 160729-080 | 5.0 | 50 | 130 | 53.14 | 160.4% | 6.3% |
| 160729-094 | 10.0 | 100 | 133 | 118.29 | 32.5% | 18.3% |
| 160729-013 | 10.0 | 100 | 89.7 | 132.86 | −10.3% | 32.9% |
| 160729-023 | 10.0 | 100 | 103 | 82.29 | 3.3% | −17.7% |
| 160729-034 | 10.0 | 100 | 108 | 70.29 | 8.2% | −29.7% |
| 160729-045 | 20.0 | 200 | 175 | 170.57 | −12.3% | −14.7% |
| 160729-009 | 20.0 | 200 | 192 | 177.43 | −4.0% | −11.3% |
| 160729-014 | 20.0 | 200 | 283 | 198.86 | 41.7% | −0.6% |
| 160729-030 | 20.0 | 200 | 180 | 223.71 | −10.1% | 11.9% |
| 160729-033 | 20.0 | 200 | 182 | 205.71 | −9.0% | 2.9% |
| 160729-036 | 20.0 | 200 | 178 | 206.57 | −10.8% | 3.3% |
| 160729-038 | 20.0 | 200 | 272 | 175.71 | 35.8% | −12.1% |
| 160729-040 | 20.0 | 200 | 93.5 | 218.57 | −53.3% | 9.3% |
| 160729-041 | 20.0 | 200 | 136 | 225.43 | −32.0% | 12.7% |
| 160729-044 | 20.0 | 200 | 174 | 217.71 | −13.1% | 8.9% |
| 160729-047 | 20.0 | 200 | 160 | 253.71 | −19.9% | 26.9% |
| 160729-057 | 20.0 | 200 | 165 | 209.14 | −17.7% | 4.6% |
| 160729-061 | 20.0 | 200 | 157 | 204.00 | −21.6% | 2.0% |
| 160729-063 | 20.0 | 200 | 169 | 214.29 | −15.4% | 7.1% |
| 160729-065 | 20.0 | 200 | 279 | 240.86 | 39.5% | 20.4% |
| 160729-074 | 20.0 | 200 | 122 | 191.14 | −39.0% | −4.4% |
| 160729-007 | 30.0 | 300 | 277 | 285.68 | −7.8% | −4.8% |
| 160729-010 | 30.0 | 300 | 239 | 303.40 | −20.4% | 1.1% |
| 160729-015 | 30.0 | 300 | 268 | 322.54 | −10.7% | 7.5% |
| 160729-027 | 30.0 | 300 | 240 | 284.26 | −20.0% | −5.2% |
| 160729-053 | 30.0 | 300 | 283 | 275.05 | −5.7% | −8.3% |
| 160729-066 | 30.0 | 300 | 295 | 281.43 | −1.6% | −6.2% |
| 160729-075 | 30.0 | 300 | 239 | 270.79 | −20.3% | −9.7% |
| 160729-081 | 30.0 | 300 | 284 | 252.36 | −5.3% | −15.9% |
| 160729-092 | 30.0 | 300 | 295 | 279.30 | −1.7% | −6.9% |
| 160729-099 | 40.0 | 400 | 411 | 414.70 | 2.6% | 3.7% |
| 160729-004 | 40.0 | 400 | 425 | 370.04 | 6.3% | −7.5% |
| 160729-020 | 40.0 | 400 | 372 | 386.34 | −7.0% | −3.4% |
| 160729-021 | 40.0 | 400 | 376 | 395.56 | −6.1% | −1.1% |
| 160729-022 | 40.0 | 400 | 334 | 409.74 | −16.5% | 2.4% |
| 160729-026 | 40.0 | 400 | 412 | 421.79 | 2.9% | 5.4% |
| 160729-028 | 40.0 | 400 | 373 | 426.75 | −6.8% | 6.7% |

TABLE 5-continued

Peak Currents - Scan
Test # 2 Data (SEMS Remote Detector Configuration)

| | | SAMPLE CONCENTRATIONS | | STATISTICAL ANALYSIS | |
|---|---|---|---|---|---|
| SAMPLE NO. ELSA- | Nominal | EPA 200.8 ICP-MS | M394-SEMS ASV | EPA200.8 ICP-MS | M394-SEMS ASV |
| | | Concentration, ug Ag+/l | | Variance | |
| 160729-029 | 40.0 | 400 | 377 | 443.05 | −5.7% | 10.8% |
| 160729-031 | 40.0 | 400 | 371 | 426.04 | −7.2% | 6.5% |
| 160729-032 | 40.0 | 400 | 371 | 379.96 | −7.2% | −5.0% |
| 160729-037 | 40.0 | 400 | 368 | 415.41 | −8.1% | 3.9% |
| 160729-043 | 40.0 | 400 | 337 | 386.34 | −15.8% | −3.4% |
| 160729-054 | 40.0 | 400 | 418 | 416.12 | 4.6% | 4.0% |
| 160729-059 | 40.0 | 400 | 357 | 403.36 | −10.7% | 0.8% |
| 160729-062 | 40.0 | 400 | 360 | 406.19 | −10.0% | 1.5% |
| 160729-068 | 40.0 | 400 | 382 | 377.13 | −4.4% | −5.7% |
| 160729-072 | 40.0 | 400 | 372 | 370.04 | −7.1% | −7.5% |
| 160729-077 | 40.0 | 400 | 365 | 388.47 | −8.7% | −2.9% |
| 160729-083 | 40.0 | 400 | 395 | 409.03 | −1.2% | 2.3% |
| 160729-085 | 40.0 | 400 | 393 | 404.77 | −1.6% | 1.2% |
| 160729-098 | 40.0 | 400 | 337 | 443.05 | −15.7% | 10.8% |
| 160729-005 | 50.0 | 500 | 522 | 563.56 | 4.3% | 12.7% |
| 160729-006 | 50.0 | 500 | 497 | 557.89 | −0.5% | 11.6% |
| 160729-064 | 50.0 | 500 | 476 | 530.95 | −4.9% | 6.2% |
| 160729-076 | 50.0 | 500 | 494 | 492.67 | −1.2% | −1.5% |
| 160729-088 | 50.0 | 500 | 477 | 487.71 | −4.5% | −2.5% |
| 160729-095 | 50.0 | 500 | 483 | 487.00 | −3.4% | −2.6% |
| 160729-001 | 75.0 | 750 | 660 | 710.30 | −12.0% | −5.3% |
| 160729-002 | 75.0 | 750 | 863 | 888.23 | 15.0% | 18.4% |
| 160729-003 | 75.0 | 750 | 833 | 828.69 | 11.1% | 10.5% |
| 160729-024 | 75.0 | 750 | 721 | 726.61 | −3.8% | −3.1% |
| 160729-035 | 75.0 | 750 | 660 | 689.04 | −12.0% | −8.1% |
| 160729-055 | 75.0 | 750 | 825 | 735.82 | 10.1% | −1.9% |
| 160729-060 | 75.0 | 750 | 786 | 327.50 | 4.7% | −56.3% |
| 160729-071 | 75.0 | 750 | 786 | 587.67 | 4.8% | −21.6% |
| 160729-087 | 75.0 | 750 | 774 | 724.48 | 3.1% | −3.4% |
| 160729-091 | 75.0 | 750 | 769 | 796.08 | 2.6% | 6.1% |
| 160729-012 | 100.0 | 1000 | 941 | 948.54 | −5.9% | −5.1% |
| 160729-052 | 100.0 | 1000 | 917 | 1035.88 | −8.3% | 3.6% |
| 160729-073 | 120.0 | 1200 | 1216 | 1102.91 | 1.4% | −8.1% |
| 160729-084 | 120.0 | 1200 | 1144 | 1085.31 | −4.7% | −9.6% |
| 160729-086 | 120.0 | 1200 | 1236 | 1169.94 | 3.0% | −2.5% |
| 160729-096 | 120.0 | 1200 | 1243 | 1051.46 | 3.6% | −12.4% |
| 160729-097 | 120.0 | 1200 | 1199 | 1255.92 | −0.1% | 4.7% |
| 160729-049 | 150.0 | 1500 | 1454 | 1287.75 | −3.1% | −14.2% |
| 160729-050 | 150.0 | 1500 | 1400 | 1491.54 | −6.7% | −0.6% |
| 160729-051 | 150.0 | 1500 | 1551 | 1565.34 | 3.4% | 4.4% |
| 160729-056 | 200.0 | 2000 | 1975 | 2027.76 | −1.3% | 1.4% |
| 160729-067 | 200.0 | 2000 | 1930 | 1712.93 | −3.5% | −14.4% |
| 160729-089 | 200.0 | 2000 | 944 | 1685.17 | −52.8% | −15.7% |
| 160729-046 | 200.0 | 2000 | 2957 | 1886.93 | 47.9% | −5.7% |

Figure 16:
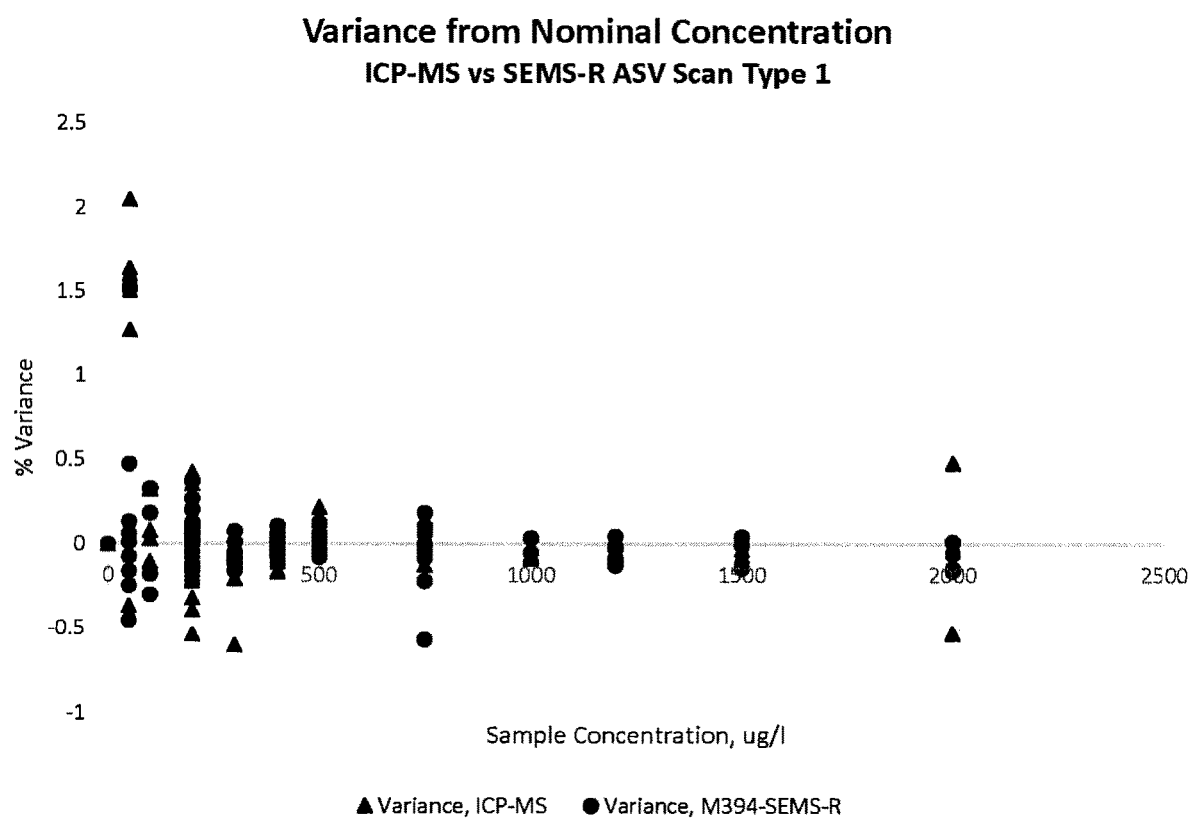
FIG. 16 shows variance data comparing a disclosed embodiment and the ICP-MS method.

As can be seen from FIGS. 16, the disclosed detector 220 outperforms the inductively coupled plasma mass spectrometry (ICP-MS) method at almost the entire concentration range. Some of the scatter in the data are likely due to the sample preparation using Eppendorf pipettors to dose the water with Ag+, and these have quite a lot of variance at lower injection amounts, based on the increased variance seen at the lower concentrations. What these data show well is the decrease in variance, and potentially a decrease in relative standard deviation, throughout the anticipated concentration range for many applications, which is about 200 μg/l to about 1,000 μg/l.

Embedded Controller and Instrument Electronic Design & Fabrication

A miniaturized control system may be utilized to provide detector operation and silver ion generation capability. In certain embodiments, the embedded controller 212 is designed for a high level of integration and operational performance and is sized for mounting inside a 4"×2.5"×2" envelope. Data can be off-loaded wirelessly and/or thru a mini-USB to Android app, iOS, Win10, or a custom data acquisition system or through any other data transfer method known in the art. There is also a capability for RS-232C because of its reliability. A preformatted Excel or other spreadsheet data system may be provided for download to PC, Mac, or other computer or similar device.

Disclosed embodiments may be used to treat water in flowing water systems 120 including water streams 122 and storage tanks 124. Disclosed embodiments may be applicable to remote personnel sites, such as are common found in the oil and gas industry, military applications, and disaster recovery operations. Embodiments may be used to create or maintain suitable potable and hygiene water as well as treat water for agricultural uses such as hydroponic farming.

Analyzers 210 may additionally include an electronics control package consisting of integrated printed circuit boards for instrument component control, electrode waveform application and current measurement (potentiostat), ultrasound transducer control, and on-board data storage and display device. The potentiostat serves as the digital to analog interface for supplying the electrochemical scan to the electrodes. It also performs the analog to digital conversion interface that measures the analog current (corresponding to metal concentration) from the electrodes and transfers it to a digital signal that is used by the on-board microprocessor that controls the measurement process and calculates he analytical results. The potentiostat sub-assembly may be designed to have an input sensitivity from less than 1 nano-amp to 100 milliamps to allow a wide linear operating range for silver analysis by the disclosed voltammetry scan methods.

The configuration of the various detector embodiments may be matched to the needs of the application, using the internal electrode configuration. Each detector cell preferably contains a working electrode, a reference electrode, and an auxiliary electrode. The main body of the instrument is preferably machined from engineering thermoplastics. Liquid flow passages are preferably constructed using either HPLC-type tubing and fittings or a single injection-molded device.

Software Development

In certain embodiments, the microprocessor and/or controller software is responsible for several instrument control functions: calibration; potentiostat voltage input through DAC (applied potential and waveform); potentiostat gain control; quantitation current (ADC) log; calculation of silver concentration; relay of silver concentration to external display; storage of data on microprocessor; storage of operating programs in on-board, non-volatile memory; and/or download of data to data acquisition system.

Software for on-board operation of the analyzer has been written and compiled for storage onto a controller 212, preferably an embedded controller. In preferred embodiments, the instrument operating software incorporates all functions required for automation of analysis of silver in process streams and incorporates machine learning algorithms with smart self-management capabilities.

Automated subroutines supporting the inclusion of the solid phase reagent controlled-release cartridges to produce known, non-interfering peaks for use as an internal method for self-calibration and quality assurance may be incorporated into certain embodiments of the disclosed software.

Dilution Method of Silver Ion Concentration Adjustment

In certain embodiments, a dilution method may be utilized in order to obtain the desired effluent silver ion concentration. This method may be used with any of the other techniques disclosed and may be used to adjust the concentration of silver ion in the effluent of any silver ion releasing system. In order to achieve the desired effluent silver ion concentration, the initially released effluent may be of a higher silver ion concentration and then the initial effluent may be diluted down to the desired silver ion concentration using water containing a lower silver ion concentration. The dilution water may contain substantially zero silver ion or may contain a lower concentration that is ultimately desired for the effluent.

If the concentration of silver ion in the dilution water and the concentration of silver ion in the initial effluent are both known, the amount of dilution water needed to reach the desired concentration may be calculated. In certain embodiments, this process may be done automatically and/or continuously using a processor. If the concentration of silver ion is not known for either the dilution water or the initial effluent, the concentration may be measured slightly down stream and the volume of dilution water utilized may be adjusted in response to the down-stream silver ion concentration. FIG. 8 shows an exemplary schematic of one embodiment of a silver ion biocide delivery device utilizing silver ion dilution to achieve the desired final silver ion concentration. As described, the effluent Ag+ concentration may be adjusted by controlling the dilution of the silver ion releasing unit's effluent with water containing a lower concentration of silver ion. This method may be utilized in isolation or in combination with the other techniques disclosed herein.

Time Cycling Method of Silver Ion Concentration Adjustment

Certain embodiments of a silver ion biocide delivery device may utilize a time-cycling method of controlling the concentration of silver ion in the water stream. This method takes advantage of a bypass loop which may be used to allow a portion of the water stream to bypass the silver ion delivery device. By adjusting the amount of time that water is circulated through the silver ion delivery device, the concentration of silver ion in the water system may be adjusted. If the particular silver ion delivery device being used delivers a higher concentration of silver ion than is ultimately desired, this technique can be used in order to regulate the amount of time that water is passed through the silver ion delivery device. Once a desired concentration of silver ion has been reached, the bypass loop may be activated. This stops the addition of any more silver ion until it is determined that additional silver ion in desired. At that time, water may be passed through the silver ion delivery device again. This timing method may be pre-arranged for a known set of conditions or may be controlled in response to measured silver ion concentration at any point throughout the water system.

Figure 9:
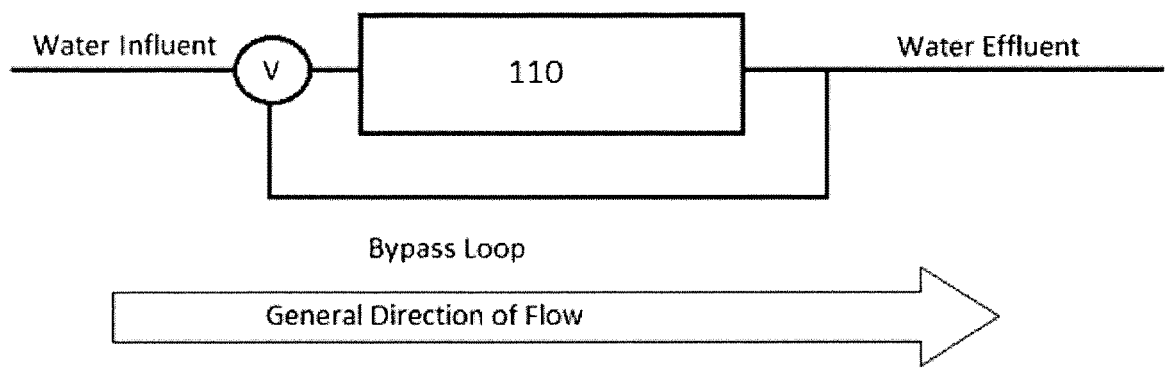
FIG. 9 shows a schematic of a water system utilizing time cycling to adjust the concentration of silver ion.
Figure 10:
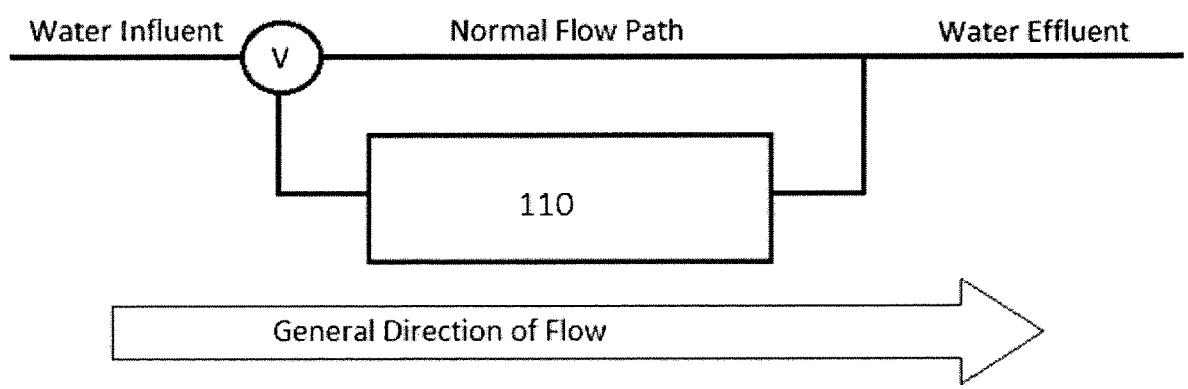
FIG. 10 shows an additional schematic of a water system utilizing time cycling to adjust the concentration of silver ion.
Figure 11:
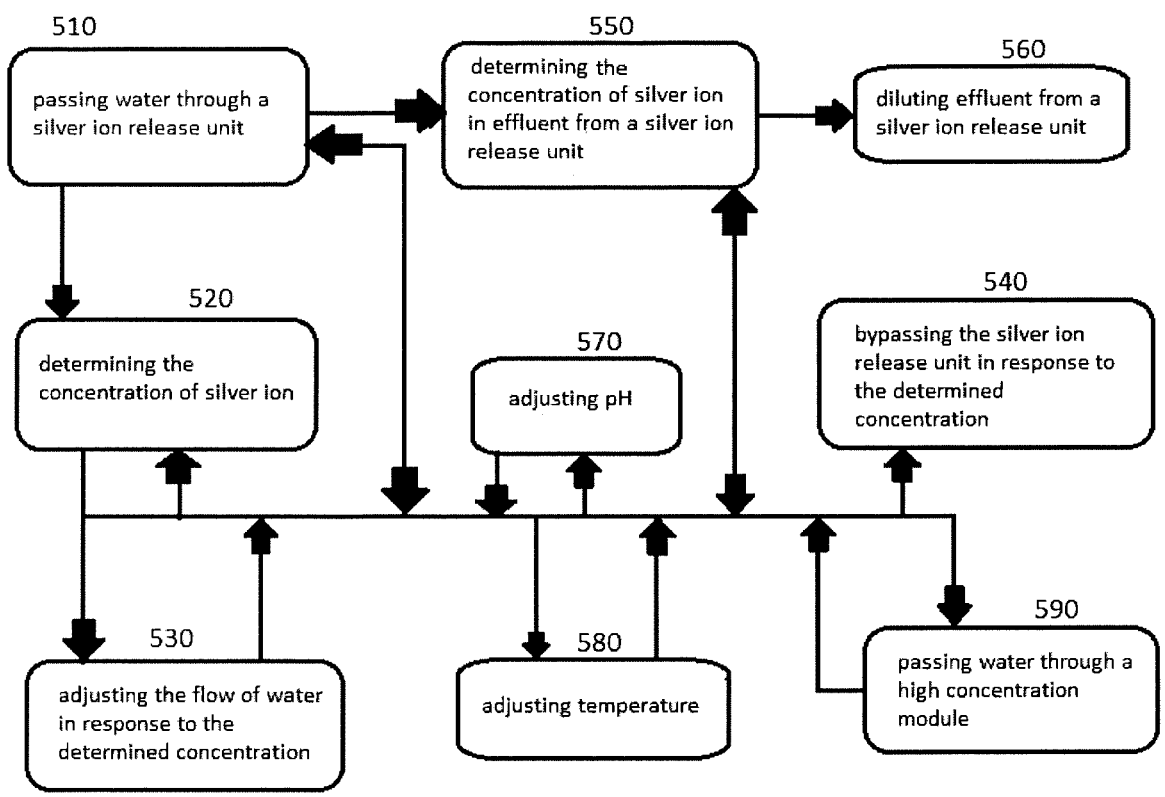
FIG. 11 shows some of the many potential method steps which may be taken in an exemplary embodiment.

The control valve 140 used to direct water through the silver ion delivery device and/or the bypass loop may be configured to allow all, none, or a portion of the influent water stream to be directed through the silver ion delivery device or the bypass loop. FIGS. 9 and 10 show two exemplary schematics of potential embodiments of a water system configured to use a time-cycling and/or bypass method of silver ion concentration adjustment.

Certain disclosed embodiments relate to a silver ion biocide delivery system comprising a silver ion release unit 110 wherein the silver ion release unit 110 is capable of producing an effluent comprising water and silver ions and/or configured to be in fluid communication with a water system 120, wherein the silver ion release unit 110 comprises a silver ion source such as, for example a metal oxide, carbonate, or salt containing silver; a high concentration silver module 130 configured to produce a high concentration effluent comprising water and silver ions and/or in fluid communication with the water system 120; and an electroanalytical analyzer 210, wherein the analyzer comprises a voltammetric detector 220 operably connected to a controller 230, wherein the controller 230 is configured to determine the concentration of silver ion at one or more points in a water system and initiate action based on the determined concentration of silver ion. Some embodiments further comprise at least one valve 140 operably connected to the controller 230, wherein the controller 230 is configured to direct the valve 140 to alter the flow of water through a water system 120 based on the determined concentration of silver ion. In some embodiments, the silver ion release unit 110 comprises at least one of $AgBr$, $Ag_3PO_4$ or $Ag_2CO_3$, the concentration of silver ion in the effluent of silver ion release unit 110 is between about 100 µg/l and about 1,000 µg/l, and/or the concentration of silver ion in the effluent of the high concentration silver module 130 is between about 1,000 µg/l and about 10,000 µg/l.

In still more embodiments, the silver ion release unit 110 is configured to release silver ion and a second metal ion. In some of these embodiments, the second metal ion is copper or nickel. In some embodiments, the controller 230 is configured to determine the concentration of the second metal ion in the water system 120 and determine a ratio of silver ion concentration to the concentration of the second metal ion and calibrate the detector 220 based on the determined ratio.

In particular embodiments, the silver ion release unit 110 comprises a resin, wherein the resin is selected from the group consisting of strong base anion exchange resins, strong acid cationic exchange resins and chelating resins; the silver ion release unit 110 comprises engineered shapes of silver containing material; and/or the silver ion release unit 110 comprises porous packets of silver containing material.

Certain embodiments further comprise an electrochemical silver ion generator 240 operably connected to the controller, a solid phase calibration standard 250, wherein the solid phase calibration standard 250 comprises silver-nickel alloy; a pH adjustment module 150 configured to be in fluid communication with a water system and/or a temperature adjustment module 160 configured to be in fluid communication with a water system. In still more embodiments, the system further comprises a spectrophotometric detector and/or a UV/VIS Spectrometer.

Some disclosed embodiments relate to a method of maintaining a predetermined range of silver ion concentration in a water system, the method comprising the steps of: passing water through a silver ion release unit 510, wherein the silver ion release unit 110 comprises a silver ion source such as, for example a metal oxide, carbonate, or salt containing silver; determining the concentration of silver ion in the water system 520 using a detector; and adjusting the silver ion concentration in response to the determined concentration of silver ion 530. In some embodiments, the adjusting the silver ion concentration is performed by adjusting the flow path of the water in a water system. In some of these embodiments, the effluent of the silver ion release unit has a silver ion concentration between about 1,000 µg/l and about 10,000 µg/l and/or the flow of water is directed to bypass the silver ion release unit for a period of time in response to the determined concentration of silver ion 540. Some embodiments further comprise the step of measuring the concentration of silver ion in the effluent of the silver ion release unit 550 and diluting the effluent 560 with water having a lower concentration of silver ion than the effluent. Many embodiments further comprise the steps of adjusting the pH 570 of the water in the water system, adjusting the temperature 580 of the water in the water system, and/or passing the water through a high concentration module 590.

Certain disclosed embodiments relate to a system for treating potable water, the system comprising: an electoanalytical analyzer, wherein the analyzer comprises a controller, a first voltammetric detector operably connected to the controller wherein the detector comprises at least one solid-state electrode; and a silver ion generator operably connected to the controller and configured to release silver ion into a water supply; wherein the controller is configured to determine the concentration of silver ion in the water supply and direct the operation of the silver ion generator in response to the determined concentration. Certain embodiments comprise a controlled release cartridge, wherein the release cartridge is configured to release a second metal ion species into the water supply, wherein the second metal ion species is not silver. In some embodiments, the controller is configured to monitor the ratio of silver ion concentration to the concentration of the second metal ion species, and the controller is configured to calibrate the detector based on the ratio. In other embodiments, the controller determines the concentration of silver ion in the water supply by applying an electrical pulse to the detector electrode and monitoring the current consumed. In still more embodiments, the system further comprises a spectrophotometric detector and/or a UV/VIS Spectrometer. In some embodiments, the second metal ion species is nickel and/or the controlled release cartridge comprises a solid phrase calibration standard. Particular embodiments comprise a second voltammetric detector operably connected to the controller, wherein the controller is configured to determine the concentration of silver ion using data from the first and second detectors. In some embodiments, the system is substantially free from mercury, the solid phase reagent comprises a silver-nickel alloy, and/or the water supply comprises highly finished water substantially free of oils or surfactants. In some embodiments, the analyzer is gravity independent.

Some disclosed embodiments relate to a microbial control system comprising a silver ion release unit, wherein the silver ion release unit is capable of producing an effluent comprising water and silver ions, and wherein the silver ion release unit comprises a silver ion source; and a microbial detector operably connected to the silver ion release unit wherein the detector is capable of determining the amount of microbial contamination at one or more points in a water system and initiate action based on the determined level of contamination. Certain embodiments may adjust the silver ion concentration automatically, or provide notice for the silver ion concentration to be manually adjusted.

Certain disclosed embodiments relate to a method of maintaining a silver ion concentration, the method comprising the steps of: detecting the concentration of silver ion in a water supply using a voltammetric detector 610; detecting the concentration of a second metal ion using a voltammetric detector 630; comparing the detected concentration of silver ion and the detected concentration of the second metal ion 640; and initiating action based on the detected concentrations of the silver ion and second metal ion. In some embodiments, the method further comprises detecting the concentration of silver ion in a water supply using a second remotely located voltammetric detector 660, directing a metal ion generator to release silver ion into the water supply 620, directing a metal ion generator to not release silver ion into the water supply 670, and/or initiating mechanical polishing of a detector electrode 650. In certain embodiments, the second metal ion is nickel, and/or detecting the concentration of silver ion comprises anodic stripping voltammetry. In still more embodiments, the step of anodic stripping voltammetry comprises pre-concentrating silver ion analyte onto an electrode surface, applying electrical potential to the electrode, stripping the pre-concentrated analyte from the electrode surface, and analyzing the current consumed in order to determine the concentration of the analyte.

The terms and descriptions used herein are set forth by way of illustration only and are not meant as limitations.

Those skilled in the art will recognize that many variations are possible within the spirit and scope of the invention as defined in the following claims, and their equivalents, in which all terms are to be understood in their broadest possible sense unless otherwise indicated.

What is claimed is:

1. A silver ion biocide delivery system comprising:
a silver ion release unit, wherein the silver ion release unit is capable of producing an effluent comprising water and silver ions, and wherein the silver ion release unit comprises a silver ion source;
a high concentration silver module configured to produce a high concentration effluent comprising water and silver ions wherein the silver concentration of the high concentration effluent is higher than the silver concentration in the effluent of the silver ion release unit; and
an electroanalytical analyzer, wherein the analyzer comprises a detector operably connected to a controller and at least one valve operably connected to the controller, wherein the controller is configured to determine a concentration of silver ion at one or more points in a water system and to direct the at least one valve to alter the flow of water through the water system to increase or decrease the concentration of silver ions in the water system based on the determined concentration of silver ion.

2. The system of claim 1, wherein the detector employs a colorimetric analysis method, a spectrophotometric analysis method, a potentiometric method, or a voltammetric method.

3. The system of claim 1, wherein the silver ion release unit comprises at least one of $AgBr$, $Ag_3PO_4$ or $Ag_2CO_3$.

4. The system of claim 1, wherein the concentration of silver ion in the effluent of the silver ion release unit is between about 100 µg/l and about 1,000 µg/l.

5. The system of claim 1, wherein the concentration of silver ion in the high concentration effluent of the high concentration silver module is between about 1,000 µg/l and about 10,000 µg/l.

6. The system of claim 1, wherein the silver ion release unit is configured to release silver ion and a second metal ion.

7. The system of claim 6, wherein the second metal ion is copper or nickel.

8. The system of claim 6, wherein the controller is configured to determine the concentration of the second metal ion in a water system and determine a ratio of silver ion concentration to the concentration of the second metal ion and calibrate the voltammetric detector based on the determined ratio.

9. The system of claim 1, wherein the silver ion release unit comprises a resin, wherein the resin is selected from the group consisting of anion exchange resins, cationic exchange resins and chelating resins.

10. The system of claim 1, wherein the silver ion release unit comprises engineered shapes of silver containing material.

11. The system of claim 1, wherein the silver ion release unit comprises porous packets of silver containing material.

12. The system of claim 1, further comprising an electrochemical silver ion generator operably connected to the controller.

13. The system of claim 1, further comprising a solid phase calibration standard, wherein the solid phase calibration standard comprises silver-nickel alloy.

14. The system of claim 1, further comprising a pH adjustment module configured to be in fluid communication with a water system, wherein the pH adjustment module comprises a solid phrase reagent and is configured to modify the silver ion concentration of effluent from a silver ion release unit.

15. The system of claim 1, further comprising a temperature adjustment module configured to be in fluid communication with a water system.

* * * * *